United States Patent [19]

Shimegi et al.

[11] Patent Number: 5,164,935
[45] Date of Patent: Nov. 17, 1992

[54] MAGNETO-OPTICAL DISK STORAGE HAVING ERRONEOUS INSERTION PREVENTION MECHANISM

[75] Inventors: Hiroo Shimegi; Hidemitsu Fujisawa; Manabu Ogura, all of Amagasaki; Keiji Uehara, Musashino; Masayuki Suzuki, Musashino; Yoshiki Kirinoe, Musashino; Yasushi Noda, Musashino, all of Japan

[73] Assignees: Mitsubishi Electric Company; Teac Corporation, Japan

[21] Appl. No.: 714,705

[22] Filed: Jun. 13, 1991

[30] Foreign Application Priority Data

Jun. 15, 1990 [JP] Japan ............................ 2-157171
Jan. 16, 1991 [JP] Japan ............................ 3-3484

[51] Int. Cl.$^5$ ............................................. G11B 33/02
[52] U.S. Cl. ................................................. 369/77.2
[58] Field of Search ................. 369/75.1, 75.2, 77.1, 369/77.2, 291, 292; 360/133, 137

[56] References Cited

U.S. PATENT DOCUMENTS

| | | | |
|---|---|---|---|
| 4,800,554 | 1/1989 | Yamasaki et al. | 369/77.2 |
| 4,829,504 | 5/1989 | Sunaga et al. | 369/47.2 |
| 4,908,817 | 3/1990 | Sandell et al. | 360/133 |
| 4,989,106 | 1/1991 | Uehara | 360/133 |
| 5,014,258 | 5/1991 | Takemasa et al. | 360/133 |
| 5,046,170 | 9/1991 | Oshima et al. | 360/133 |
| 5,063,554 | 11/1991 | Uehara | 369/77.2 |

Primary Examiner—John W. Shepperd
Assistant Examiner—Michael C. Kessell
Attorney, Agent, or Firm—Andrus, Sceales, Starke & Sawall

[57] ABSTRACT

A magneto-optical disk storage has an erroneous insertion preventing mechanism which projects into a holder so that it can touch the magneto-optical disk cartridge in order to prevent the same from being inserted. The erroneous insertion preventing mechanism mechanically engages with the magneto-optical disk cartridge and moves in a direction approximately vertical to the recording suface of the magneto-optical disk to allow the magneto-optical disk cartridge to be inserted only if the magneto-optical disk cartridge is being inserted into the holder with a correct orientation.

12 Claims, 24 Drawing Sheets

FIG. IA PRIOR ART
FIG. IB PRIOR ART
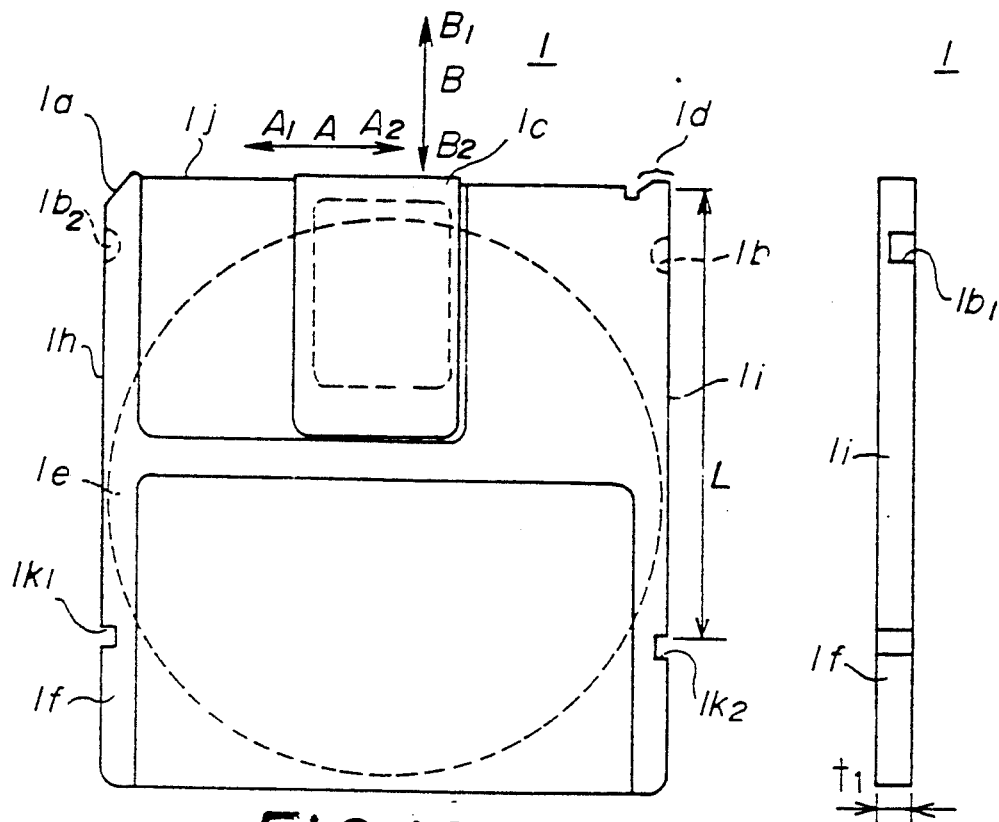
FIG. IC PRIOR ART
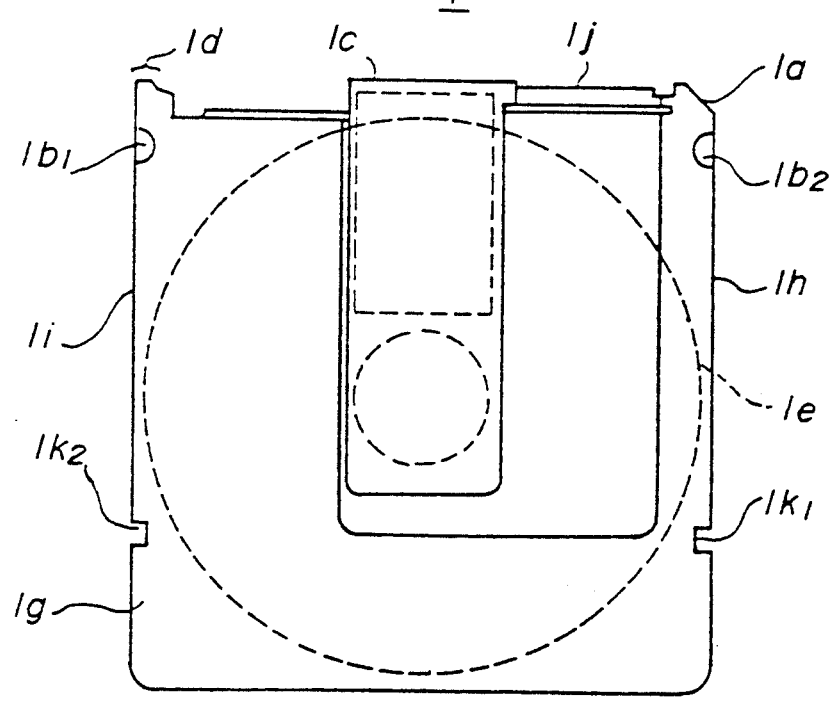

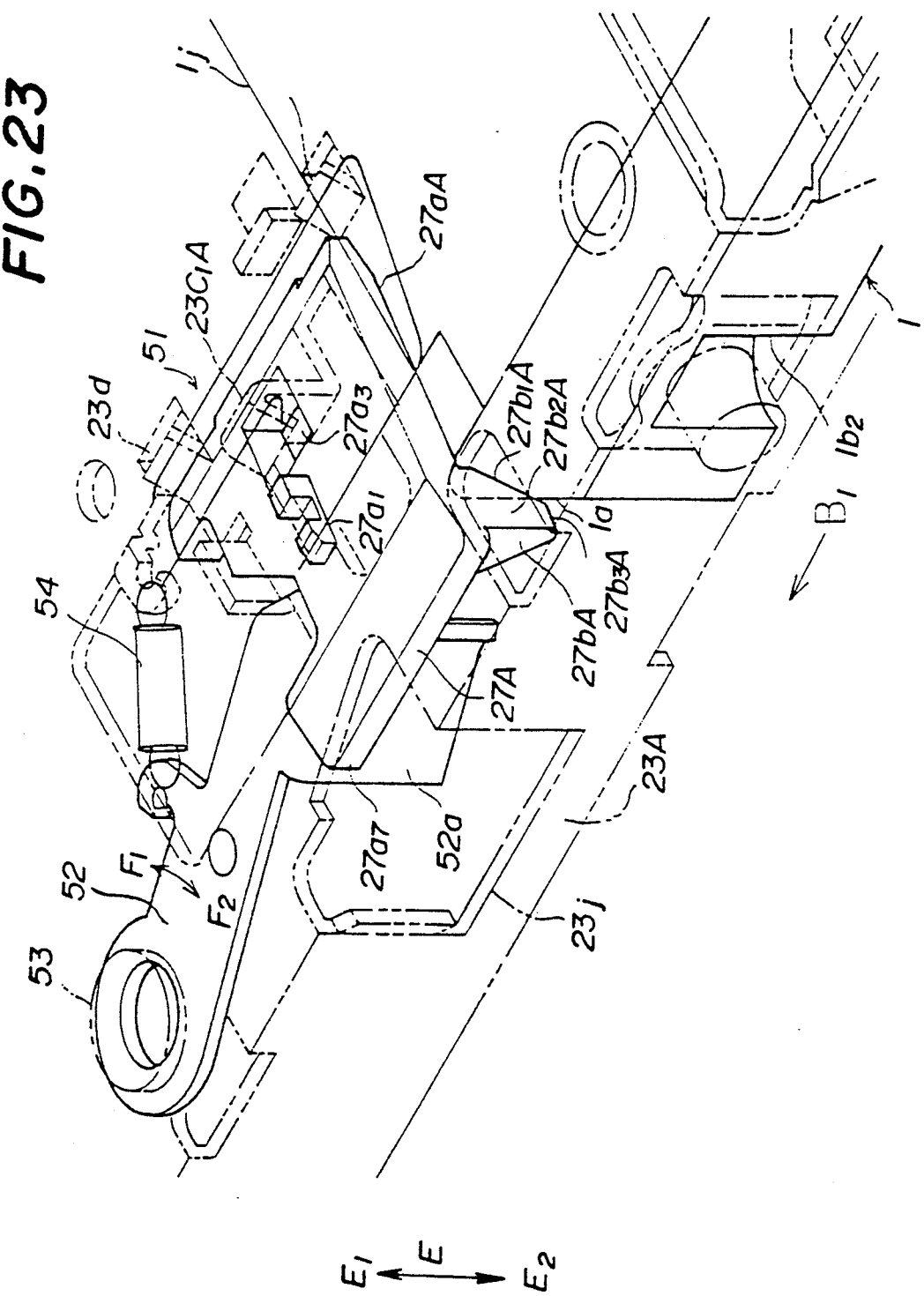

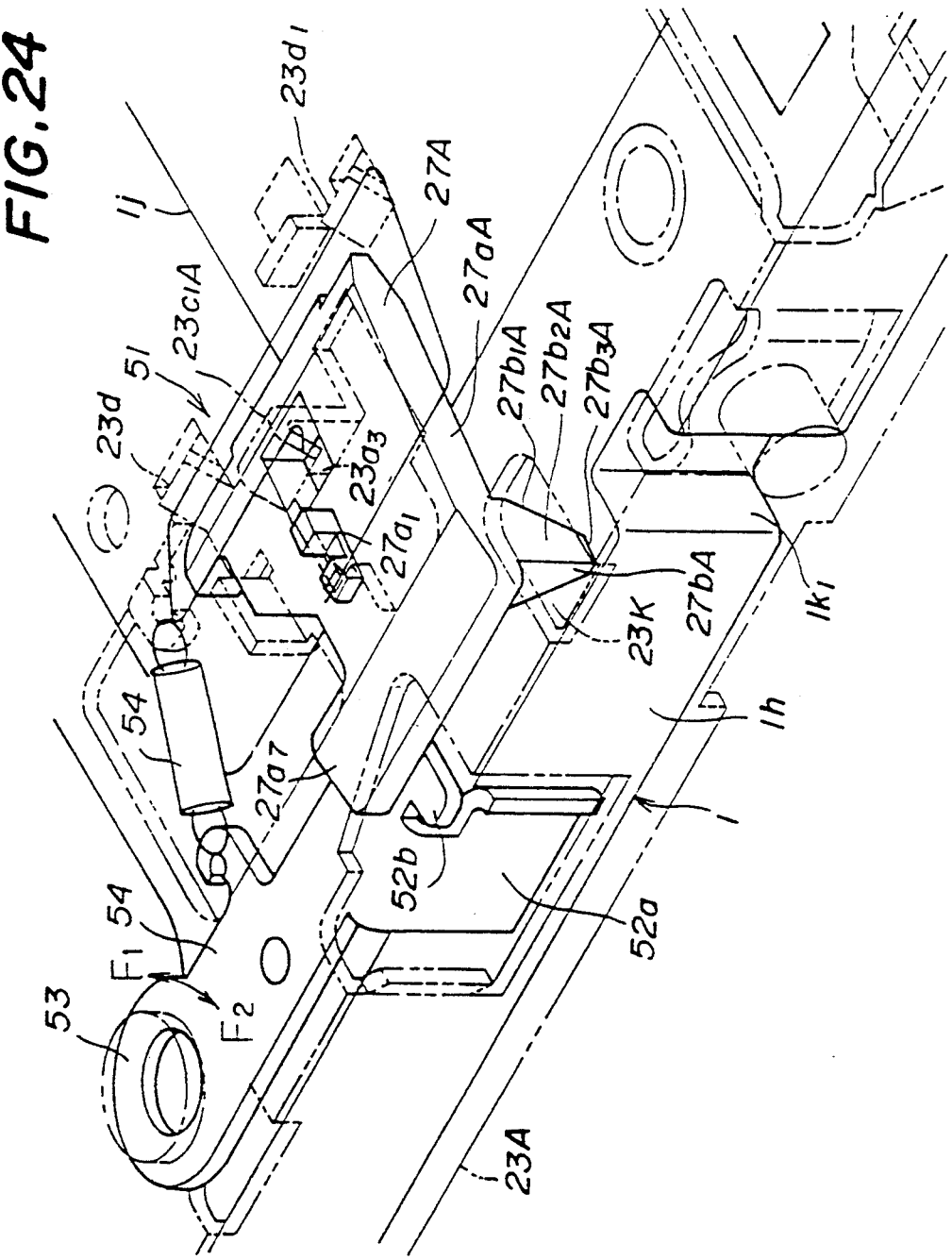

MAGNETO-OPTICAL DISK STORAGE HAVING ERRONEOUS INSERTION PREVENTION MECHANISM

BACKGROUND OF INVENTION

The present invention relates generally to optical disk storage to and from which a magneto-optical disk cartridge is inserted and ejected, and more particularly to a magneto-optical disk storage having an erroneous insertion preventing mechanism which allows a magneto-optical disk cartridge with a correct orientation to be inserted and prevents a magneto-optical disk cartridge from being inserted with an incorrect orientation and additionally prevents other disk cartridges except for a magneto-optical disk cartridge with a correct orientation from being inserted. Hereupon, the term "cartridge", as used herein, means a case having a disk therein.

Recently, magneto-optical disk cartridges have been increasingly mass-produced in response to a 3.5 in magneto-optical disk being accepted as an ISO standard. The magneto-optical disk cartridge appears to be similar to a magnetic disk cartridge and a CD-ROM cartridge. As shown in FIGS. 1A, 2A and 3A, a magneto-optical disk cartridge 1 with the correct orientation has a slanting surface 1a at the left side thereof as viewed from an insertion direction $B_1$, and the magnetic disk cartridge 2 and CD-ROM cartridge 3 respectively have slanting surfaces 2a and 3a at each right side thereof. The magneto-optical disk cartridge 1 has a thickness $t_1$ thicker than a thickness $t_2$ of the magnetic disk cartridge 2 and a thickness $t_3$ of the CD-ROM cartridge 3, so that the magneto-optical disk storage has a holder 14, to and from which the magneto-optical cartridge 1 is inserted and ejected, thicker than holders of the magnetic disk storage and CD-ROM storage. Therefore, although the magneto-optical disk cartridge 1 cannot be inserted erroneously into the magnetic disk storage and CD-ROM storage, the magnetic disk cartridge 2 and the CD-ROM cartridge 3 can be erroneously inserted into the magneto-optical disk storage. If the magnetic disk etc. are erroneously inserted into the magneto-optical disk storage, mechanical troubles and/or malfunctions will naturally happen. In addition, data recorded on the magnetic disk will be erased because of a permanent magnet (not shown) in the magneto-optical disk. Incidentally, the cartridges 1, 2 and 3 have respective detents for auto loading $1b_1$ to $3b_2$.

Thus, an erroneous insertion preventing mechanism is necessary for the magneto-optical disk storage that prevents an magneto-optical disk cartridge from being inserted in an erroneous direction and additionally prevents other cartridges except for an magneto-optical disk cartridge, such as a magnetic disk cartridge and a CD-ROM cartridge, from being inserted. Accordingly, this applicant has proposed, in U.S. Pat. No. 5,063,554, issued Nov. 5, 1991, a magneto-optical disk storage having an erroneous insertion preventing mechanism which comprises an erroneous insertion preventing member located so as to correspond to the surface 1a of the magneto-optical disk cartridge 1. A brief description will now be given of an erroneous insertion preventing mechanism 11 with reference to FIGS. 4 to 8.

As shown in FIG. 4, the erroneous insertion preventing mechanism 11 provided for a conventional magneto-optical disk storage 10 comprises an erroneous insertion preventing member 12. The erroneous insertion preventing member 12 is pivotally mounted on the holder 14, and forced in a direction $C_1$ by a spring. The erroneous insertion prevent member 12 has an erroneous insertion preventing part 12a at the top thereof, which has an approximate reverse trigonal pyramid shape and is to be inserted into a notch 14a in the holder 14. As shown in FIGS. 4 and 5, if the magneto-optical disk cartridge 1 is being inserted with a correct orientation, the slanting surface 1a of the magneto-optical disk cartridge 1 engages with a hypotenuse $12a_1$ of the erroneous insertion preventing part 12a and thus the erroneous insertion preventing part 12a is withdrawn in a direction $D_1$. Consequently, the magneto-optical disk cartridge 1 can be inserted into the holder 14. On the other hand, if the magneto-optical disk cartridge 1 is being inserted with an incorrect orientation, as shown in FIG. 6, a front edge 1d thereof touches the support side $12a_2$ and thus the magneto-optical disk cartridge 1 cannot be further inserted therein. Moreover, if the magnetic disk cartridge 2 or the CD-ROM cartridge 3 is being inserted into the magneto-optical disk storage with the correct orientation, as shown in FIG. 7, a front edge 2d (or 3d) touches the support surface $12a_2$ so that the cartridge 2 or 3 cannot be further inserted. Furthermore, if the magnetic disk cartridge 2 or the CD-ROM cartridge 3 is inserted into the magneto-optical storage with the incorrect orientation, the slanting surface 2a (or 3a) can withdraw the hypotenuse $12a_1$ in the direction $D_1$, however, the cartridge 2 or 3 cannot be completely inserted therein since a peak part $12a_3$ of the erroneous insertion preventing part 12a is inserted into the detent for auto loading $2b_1$ (or $3b_1$) to fix it. Thus only, the erroneous insertion preventing mechanism 11 allows the magneto-optical disk cartridge 1 with the correct orientation to be inserted. Incidentally, the term "with a correct orientation", as used herein, means that a cartridge is inserted with a front surface 1j facing in a direction $B_1$ and with a surface 1f facing in a predetermined direction so that the surface 1a can correspond to the hypotenuse $12a_1$. On the other hand, the term "an incorrect orientation", as used herein, means that a cartridge is inserted with a front surface 1j facing in the direction $B_1$ and with a surface 1g facing in the predetermined direction.

However, as shown in FIG. 5, the conventional erroneous insertion preventing member 12 has a disadvantage in preventing the magneto-optical disk storage cannot be made thin in the direction D since it is withdrawn in the direction D. Thus the requirement that the magneto-optical disk storage be miniaturized in the direction D (width direction) cannot be satisfied.

SUMMARY OF THE INVENTION

Accordingly, it is a general object of the present invention to provide a novel and useful magneto-optical disk storage in which the aforementioned disadvantage is eliminated.

Another object of the present invention is to provide a magneto-optical disk storage having an erroneous insertion preventing mechanism which prevents a magneto-optical disk cartridge from being inserted with an incorrect orientation and additionally prevents other disk cartridges except for a magneto-optical disk cartridge from being inserted, the magneto-optical disk storage being relatively thin in a width direction.

According to the one aspect of the present invention, a magneto-optical disk storage comprises a holder to and from which a magneto-optical disk cartridge having a magneto-optical disk therein is inserted and ejected, recording/reproducing means for recording information on a recording surface of the magneto-optical disk and/or for reproducing information therefrom, and an erroneous insertion preventing mechanism which projects into the holder so that the erroneous insertion preventing mechanism can touch the magneto-optical disk cartridge in order to prevent the same from being inserted, and which mechanically engages with the magneto-optical disk cartridge, moves in a direction approximately vertical to the recording surface of the magneto-optical disk, and allows the magneto-optical disk cartridge to be inserted only if the magneto-optical disk cartridge is being inserted into the holder with a correct orientation.

According to another aspect of the present invention, the magneto-optical disk storage comprises a holder to and from which a magneto-optical disk cartridge having a magneto-optical disk therein is inserted and ejected, recording/reproducing means for recording information on a recording surface of the magneto-optical disk and/or for reproducing information therefrom, a first erroneous insertion preventing mechanism which projects into the holder so that the first erroneous insertion preventing mechanism can touch the magneto-optical disk cartridge in order to prevent the same from being inserted, and which mechanically engages with the magneto-optical disk cartridge, moves in a first direction approximately vertical to the recording surface of the magneto-optical disk, and allows the magneto-optical disk cartridge to be inserted only if the magneto-optical disk cartridge is being inserted into the holder with a correct orientation, and a second erroneous insertion preventing mechanism which projects into the holder so that the second erroneous insertion preventing mechanism can touch the magneto-optical disk cartridge in order to prevent the same from being inserted, and which mechanically engages with the magneto-optical disk cartridge in a second direction vertical to a direction in which the magneto-optical disk is inserted and the first direction if the first erroneous insertion preventing mechanism moves.

According to the present invention, since the (first) erroneous insertion preventing mechanism, the magneto-optical disk storage is made thinner in a width direction than the conventional magneto-optical disk storage. In addition, the erroneous insertion preventing mechanism allows the magneto-optical disk cartridge to be inserted only if it is inserted with a correct orientation. Moreover, because of the second erroneous insertion preventing mechanism, the first erroneous insertion preventing mechanism can be miniaturized and the magneto-optical disk storage can be made thinner in a longitudinal direction.

Other objects and further features of the present invention will become apparent from the following detailed description when read in conjunction with the accompanying drawings.

BRIEF DESCRIPTION OF THE DRAWINGS

FIG. 1A shows a front view of the magneto-optical disk cartridge;

FIG. 1B shows a side view of the magneto-optical disk cartridge;

FIG. 1C shows a back view of the magneto-optical disk cartridge;

FIG. 23 shows a perspective view for explaining a case where the magneto-optical disk cartridge is being inserted with the correct orientation into the magneto-optical disk storage shown in FIG. 16 and touches the erroneous insertion preventing member shown in FIG. 19;

FIG. 24 shows a perspective view for explaining a case where the magneto-optical disk cartridge is being inserted with the correct orientation into the magneto-optical disk storage shown in FIG. 16 and touches the erroneous insertion preventing arm shown in FIG. 18;

DETAILED DESCRIPTION OF THE PREFERRED EMBODIMENTS

Figure 2A:
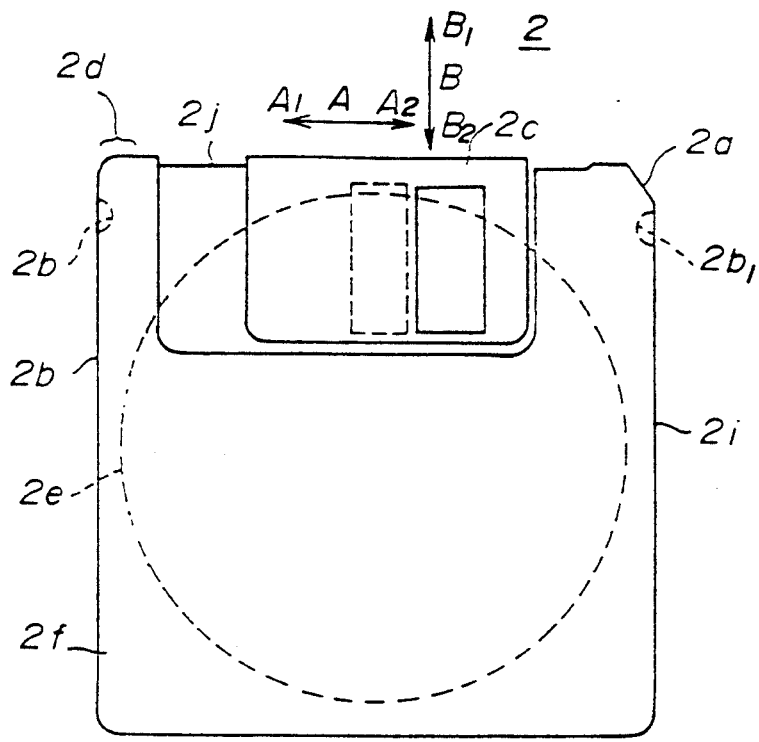
FIG. 2A shows a front view of the magnetic disk cartridge.
Figure 2B:
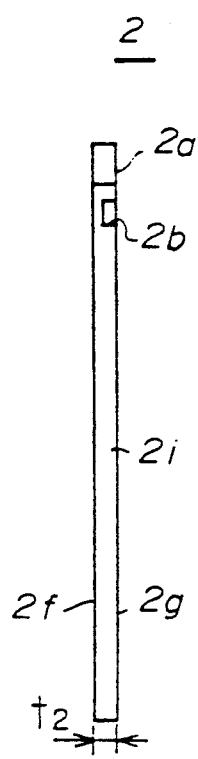
FIG. 2B shows a side view of the magnetic disk cartridge.
Figure 2C:
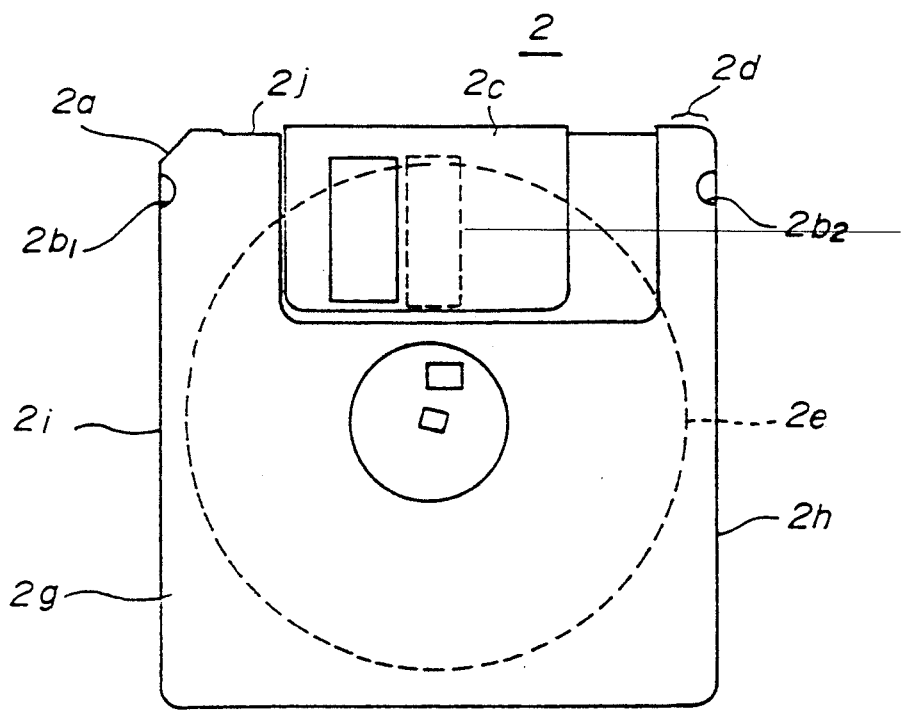
FIG. 2C shows a back view of the magnetic disk cartridge.
Figures 3A, 3B:
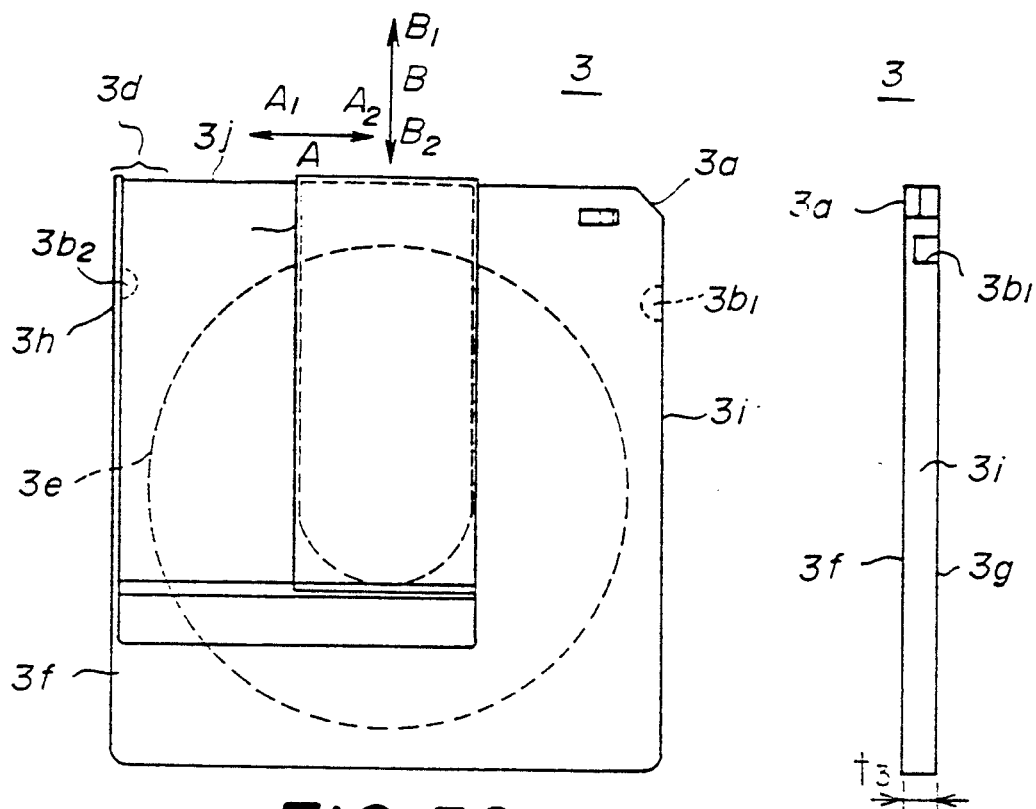
FIG. 3A shows a front view of the CD-ROM disk cartridge.
FIG. 3B shows a side view of the CD-ROM disk cartridge.
Figure 3C:
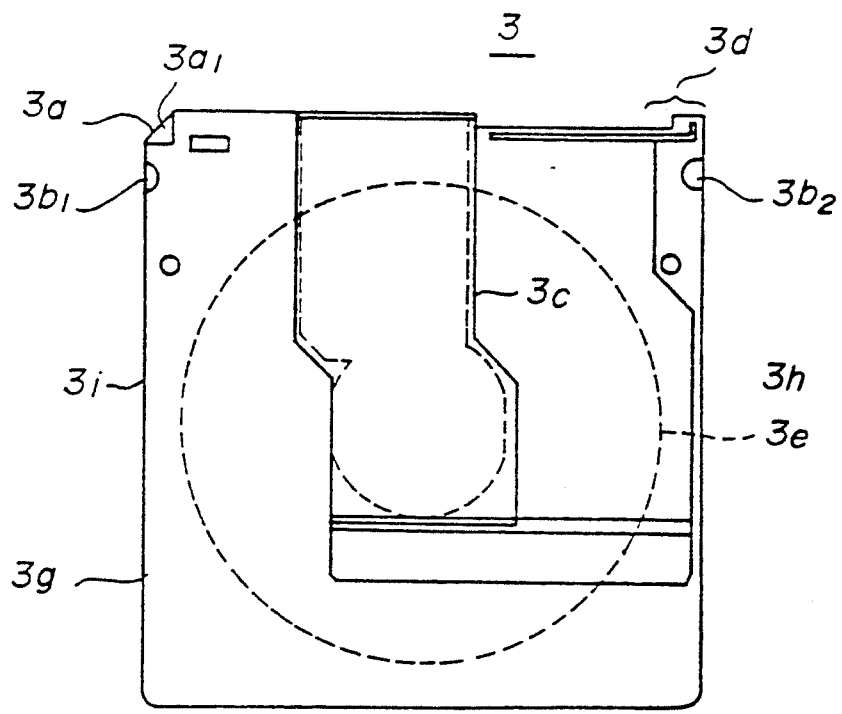
FIG. 3C shows a back view of the CD-ROM disk cartridge.
Figure 4:
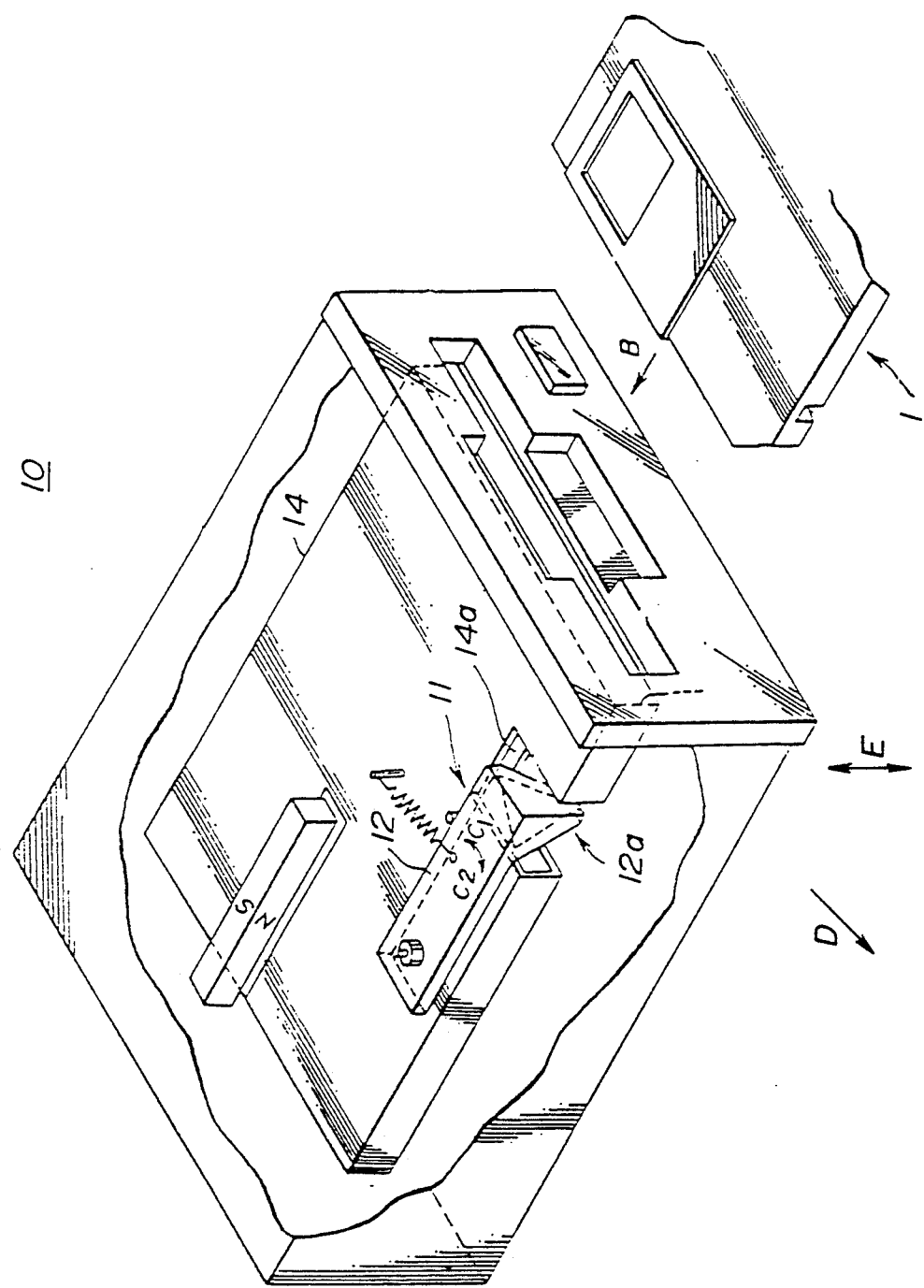
FIG. 4 shows a sectional view of a conventional magneto-optical disk storage illustrating the principles thereof.
Figure 5:
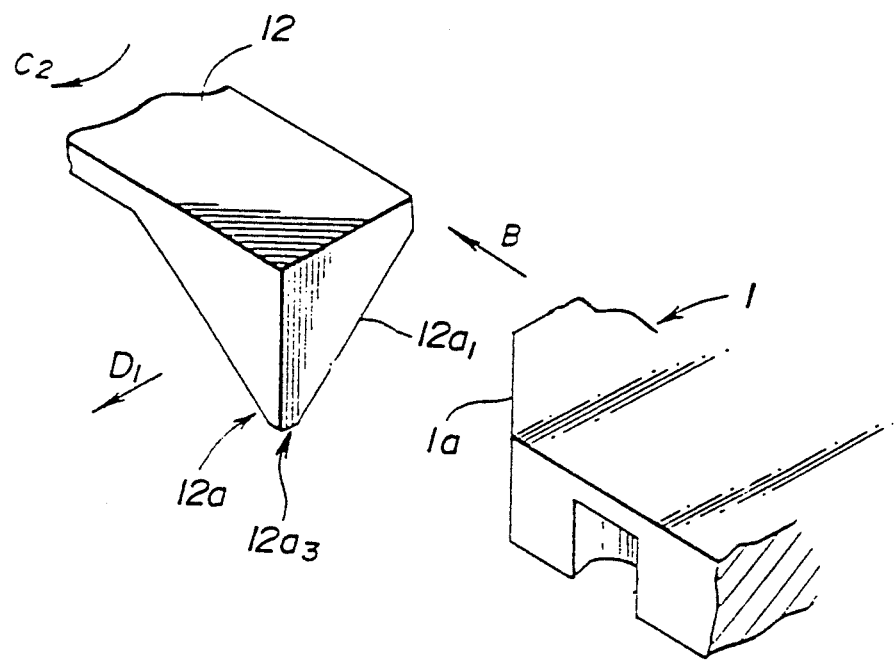
FIG. 5 shows a view for explaining a case where the magneto-optical disk cartridge is being inserted into the magneto-optical disk storage shown in FIG. 4 in a correct orientation.
Figure 6:
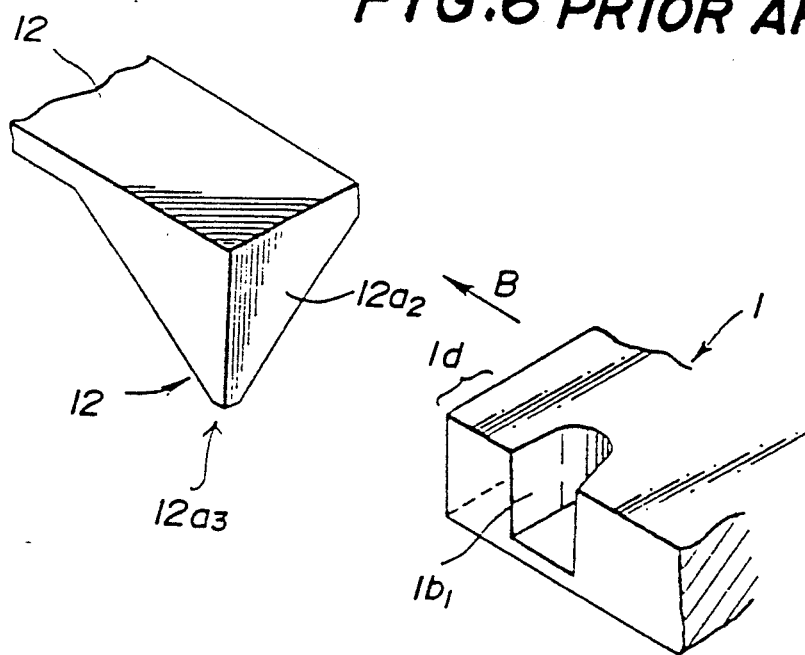
FIG. 6 shows a view for explaining a case where the magneto-optical disk cartridge is being inserted into the magneto-optical disk storage shown in FIG. 4 in an incorrect orientation.

As shown in FIGS. 1A, 2A and 3A, the magneto-optical disk cartridge 1, magnetic disk cartridge 2 and CD-ROM cartridge 3 respectively have shutters $1c$, $2c$ and $3c$. The shutters $1c$, $2c$ and $3c$ are opened by sliding them in a direction $A_1$, and forced in a direction $A_2$ by a spring (not shown). Numerals $1e$, $2e$ and $3e$ respectively denote a magneto-optical disk, a magnetic disk and a CD-ROM. Numerals $1g$ to $1j$, $2g$ to $2j$, and $3g$ to $3j$ denote surfaces. The magneto-optical disk cartridge 1 has gripper slots $1k_1$ and $1k_2$ at both side surfaces thereof apart from the front surface $1j$ by "L", which is approximately two-thirds of a span of each side surface.

Figure 9:
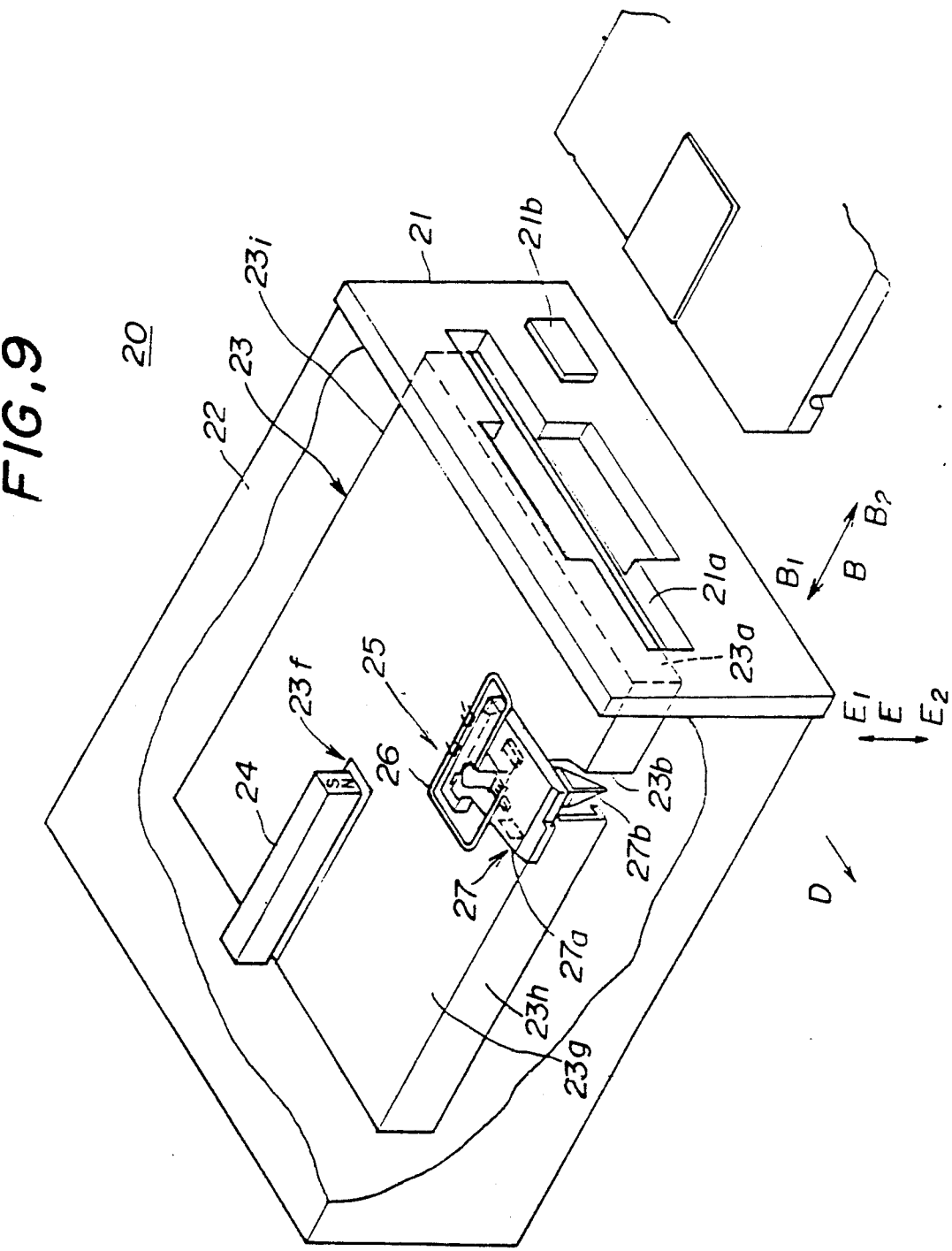
FIG. 9 shows a perspective view of a magneto-optical disk storage of a first embodiment according to the present invention.

A description will now be given of the magneto-optical disk storage 20 of the first embodiment according to the present invention with reference to FIGS. 9 to 15. As shown in FIG. 9, the magneto-optical disk storage 20 comprises a front vessel 21, a case 22, a holder 23, a permanent magnet 24 and an erroneous insertion preventing mechanism 25. The front vessel 21 and the case 22 are coupled with each other so as to form a housing having a square pillar shape, in which the holder 23 is located. The permanent magnet 24 and the erroneous insertion preventing mechanism 25 are respectively provided in the holder 23.

The front vessel 21 is rectangular and comprises an insertion mouth 21a and an eject button 21b. The insertion mouth 21a having a width corresponding to that of the front surface $1j$ is located at the center of the front vessel 21 and extends toward a longitudinal direction thereof. The magneto-optical cartridge 1 is inserted into the magneto-optical disk storage 20 and ejected therefrom via the insertion mouth 21a. The eject button 21b is engaged with a fixing member (not shown) which fixes the holder 23 at a second position $H_2$ shown in FIG. 11. The holder 23 is forced from the second position $H_2$ to the first position $H_1$ by a spring (not shown). When the eject button 21b is pushed, the holder 23 is released from being held at the second position $H_2$ by the fixing member and moves from the second position $H_2$ to the first position $H_1$. The magneto-optical disk cartridge 1 is ejected when the holder 23 reaches the first position $H_1$.

The case 22 is made by bending a metal plate into a square shape. The case 22 and the front vessel 21 protect the holder 23,-etc.

The holder 23 is made by bending a metal plate into a square shape. The holder comprises an opening 23a, a notch 23b, a perpendicular portion 23c, tabs $23d_1$, $23d_2$, $23d_3$, $23e_1$ and $23e_2$ and an opening $23f$. The holder 23 is equipped with an autoloading mechanism (not shown). The holder 23 is located, as indicated by two dots lines in FIG. 11, at the first position $H_1$ where the opening 23a corresponds to the insertion mouth 21a of the front vessel 21 when the magneto-optical disk cartridge 1 is being inserted, and then descends to the second position $H_2$ when the magneto-optical disk cartridge 1 is further inserted. When the holder 23 moves to the second position $H_2$, it is fixed there by the fixing member (not shown). Information is recorded on the magneto-optical disk $1e$ and/or reproduced therefrom when the holder 23 is located at the second position $H_2$.

The opening 23a having a width corresponding to that of the front surface $1j$ of the magneto-optical disk cartridge 1 is located at the center of the holder 23 and extends in a longitudinal direction thereof. The magneto-optical disk cartridge 1 is inserted into and ejected from the holder via the opening 23a.

A notch 23b is provided for the side surface 23h of the holder 23. The notch 23b is provided on the path where any cartridge is inserted, and if the magneto-optical disk cartridge 1 is inserted with the incorrect orientation or other disk cartridges are erroneously inserted, the notch 23b prevents the cartridge from being further inserted. However, the position of the notch 23b is determined based on "L" shown in FIG. 1 so that the erroneous insertion preventing part 27b, which will be described later, cannot be inserted into the gripper slots $1k_1$ and $1k_2$ of the magneto-optical disk cartridge 1. The notch 23b has a size corresponding to the surface 1a of the magneto-optical disk cartridge so that dust cannot be attached to the magneto-optical disk 1e.

The perpendicular portion 23c and tabs $23d_1$, $23d_2$ and $23d_3$ are respectively formed by orthogonally bending an upper surface 23g of the holder 23 in a direction $E_1$. The tabs $23e_1$ and $23e_2$ are formed by sharply bending the upper surface 23g in the direction $E_1$. The perpendicular portion 23c and tabs $23d_1$, $23d_2$, $23d_3$, $23e_1$ and $23e_2$ are respectively provided as additional members on the upper surface 23g of the holder 23. The notch 23b, perpendicular portion 23c, and tabs $23d_1$, $23d_2$, $23d_3$, $23e_1$ and $23e_2$ are, as described later, used for engaging the holder 23 with a spring member 26 of the erroneous insertion preventing mechanism 25 and the holder with an erroneous insertion preventing member 27 of the erroneous insertion preventing mechanism 25.

The opening 23f, in which the permanent magnet 24 is to be inserted, is provided on the upper surface of the holder 23g of the holder 23. The permanent magnet 24 applies an external magnetic field to the magneto-optical disk during recording and/or reproducing. As shown in FIG. 9, the permanent magnet 24 is located with the S pole upward at the center of the rear of the holder 23. Since the permanent magnet 24 is fixed to the holder 23, it moves with the holder 23.

The erroneous insertion preventing mechanism 25 comprises the spring member 25d and the erroneous insertion preventing member 27.

Figure 10:
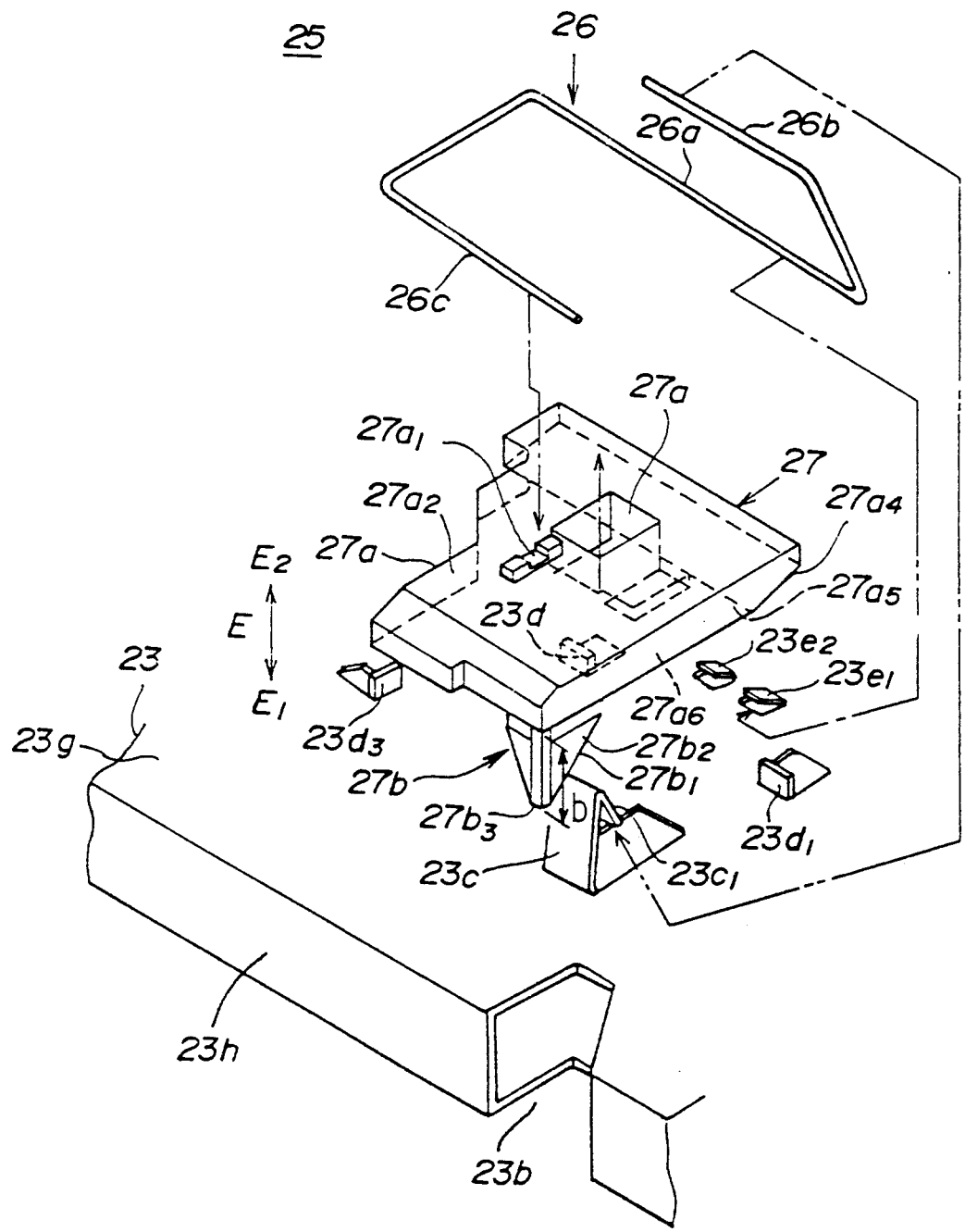
FIG. 10 shows a perspective view of an erroneous insertion preventing mechanism of the magneto-optical disk storage shown in FIG. 9.
Figure 11:
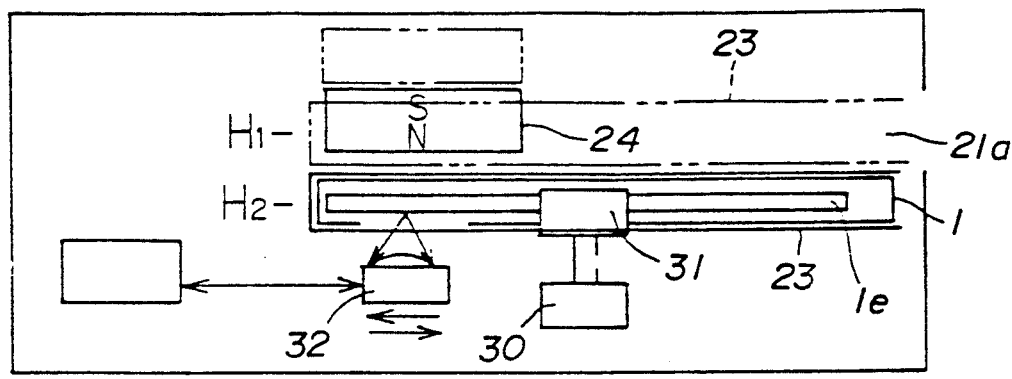
FIG. 11 shows a view for explaining a holder in the magneto-optical disk storage shown in FIG. 9.

The spring member 26 has, as shown in FIG. 10, a central part 26a and U-shaped and orthogonally twisted arms 26b and 26c at both sides of the central part 26a. The spring member forces the erroneous member 27 in the direction $E_1$ by means of its torque. The central part 26a of the spring member 26 is engaged with tabs $23e_1$ and $23e_2$. The twisted arm 26b is engaged with the fixing portion $23c_1$ of the perpendicular portion 23c, and the twisted arm 26c is engaged with the spring support $27a_1$ of the erroneous insertion preventing member 27, which will be described later. A tension spring engaged with the holder 23 and the erroneous insertion preventing member 27 may be used instead of the the spring member 26 only if it forces the erroneous member 27 in the direction $E_1$. In addition, a torsion spring may be used. In this case, tabs $23e_1$ and $23e_2$ are not needed.

The erroneous insertion preventing member 27 comprises a body 27a and an erroneous insertion preventing member 27b.

The body 27a is flat and has the spring support $27a_1$ and opening $27a_3$. The spring support $27a_1$ is concave and located on the upper surface $27a_2$ of the body 27a. However, since the spring support 27a is provided for engaging the erroneous insertion preventing member 27 with the spring member 26, it may be provided on a lower surface $27a_6$ of the body 27a. In addition, the spring member 26 may be engaged with the erroneous insertion preventing member 27 at the inside of the body 27a. The opening $27a_3$ is provided at the center of the body 27a. The perpendicular portion 23c is inserted into the opening $7a_3$. Because of the opening $27a_3$ and the perpendicular portion 23c, the erroneous insertion preventing member 27 can be moved in a direction E. As there is an offset between the opening $27a_3$ of the body 27a and the erroneous insertion preventing part 27b, a clockwise moment is applied to the erroneous insertion preventing member 27 while it ascends and descends. Accordingly, an oblique surface $27a_5$ is formed in a part of the lower surface $27a_6$, so that the body 27a can successfully rotate while it ascends and descends. The center of the rotation of the member 27 coincides with a border line $27a_5$ located between the lower surface $27a_5$ and the oblique surface $27a_4$. The border line $27a_5$ is aligned in the direction $B_1$. Since the cartridge 1 forces the body 27a in the direction $B_1$, the tab $23d_3$ is provided so that the body 27a cannot be moved despite the force exerted by the cartridge 1.

The erroneous insertion preventing part 27b is inserted into the notch 23d in the holder 23, as shown in FIG. 10. The erroneous insertion preventing part 27b has an almost reverse trigonal pyramid shape and comprises a support surface $27b_2$, a hypotenuse $27b_1$ and a peak part $27b_3$. The erroneous insertion preventing part 27b is arranged so that the surface 1a of the magneto-optical disk cartridge 1 can correspond to the hypotenuse $27b_1$. The support surface $27b_2$ has a triangle shape which corresponds to one aspect of the reverse trigonal pyramid. The hypotenuse $27b_1$ corresponds to a leg of the triangle, and the peak part $27b_3$ corresponds to the peak thereof. Hereupon, the hypotenuse $27b_1$ is inclined so as to correspond to the surface 1a. The size of the erroneous insertion preventing part 27b is determined such that the peak part $27b_3$ can touch the magneto-optical disk cartridge 1 to be inserted. In addition, the erroneous insertion preventing part 27b is spaced apart from the opening 23a so as not to be inserted into the gripper slots $1k_1$ and $1k_2$.

A description will now be given of the operation of the erroneous insertion preventing mechanism 25 with reference to FIG. 1 and FIGS. 12 to 15.

Figure 12:
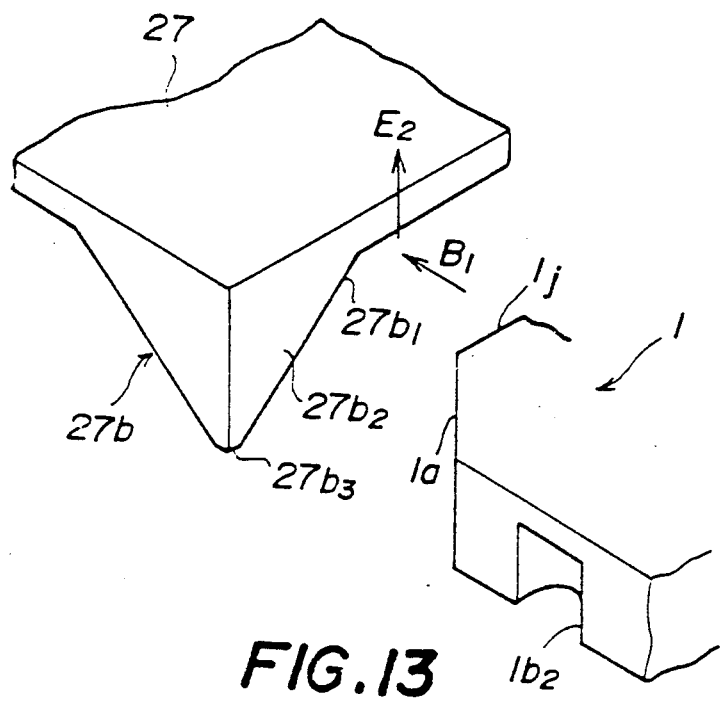
FIG. 12 shows a view for explaining a case where the magneto-optical disk cartridge is being inserted into the magneto-optical disk storage shown in FIG. 9 with a correct orientation.

First, a description will be given of a case where a magneto-optical disk cartridge 1 is being inserted with the correct orientation into the magneto-optical disk storage 20. The holder 23 is located at the first position $H_1$. When the cartridge 1 is being inserted into the holder 23 via insertion mouth 21a and the opening 23a, as shown in FIG. 12, the hypotenuse $27b_1$ of the erroneous insertion preventing part 27b touches and corresponds to the surface 1a. If the cartridge 1 is further inserted after the correspondence occures, the erroneous insertion preventing member 27 slides along the perpendicular portion 23c in the direction $E_2$, so that the cartridge 1 can be completely inserted into the holder 23. Incidentally, when the cartridge I is inserted to some degree into the holder 23, the autoloading mechanism provided in the holder 23 is mechanically engaged with the detents for auto loading $1b_1$ and $1b_2$ to automatically load the cartridge 1. At the same time, the holder 23 moves from the first position $H_1$ to the second position $H_2$. When the holder 23 is moved to the second position $H_2$, the fixing member (not shown) fixes the holder 23 at the second position $H_2$. Incidentally, the shutter of the cartridge 1 opens in the direction $A_1$ as it is being inserted into the holder 23. The magneto-optical disk 1e is mounted on a turn table 31 on the spindle motor 30, and then rotated. Information is recorded on the opened recording surface of the magneto-optical disk 1e and/or reproduced therefrom by means of the permanent magnet and the optical head 32.

Figure 13:
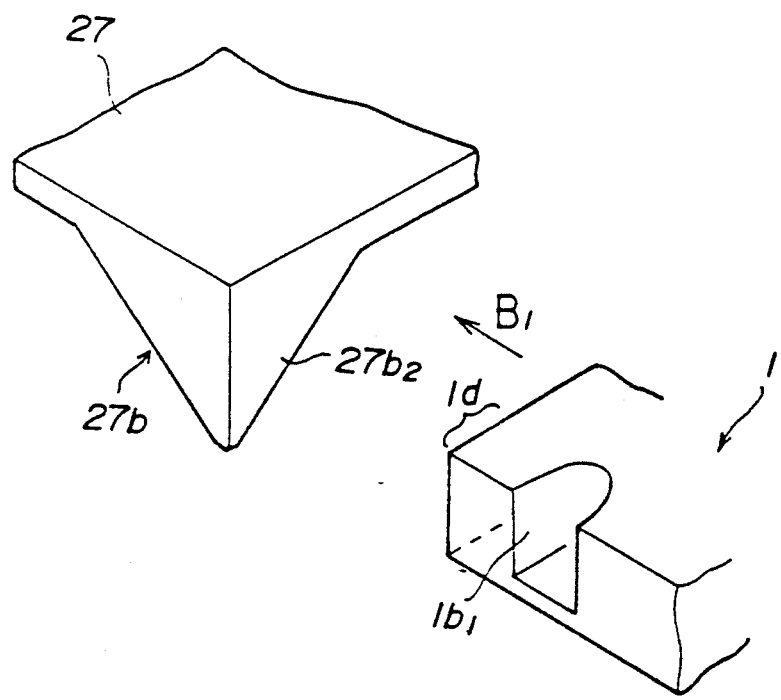
FIG. 13 shows a view for explaining a case where the magneto-optical disk cartridge is being inserted into the magneto-optical disk storage shown in FIG. 9 with an incorrect orientation.
Figure 14:
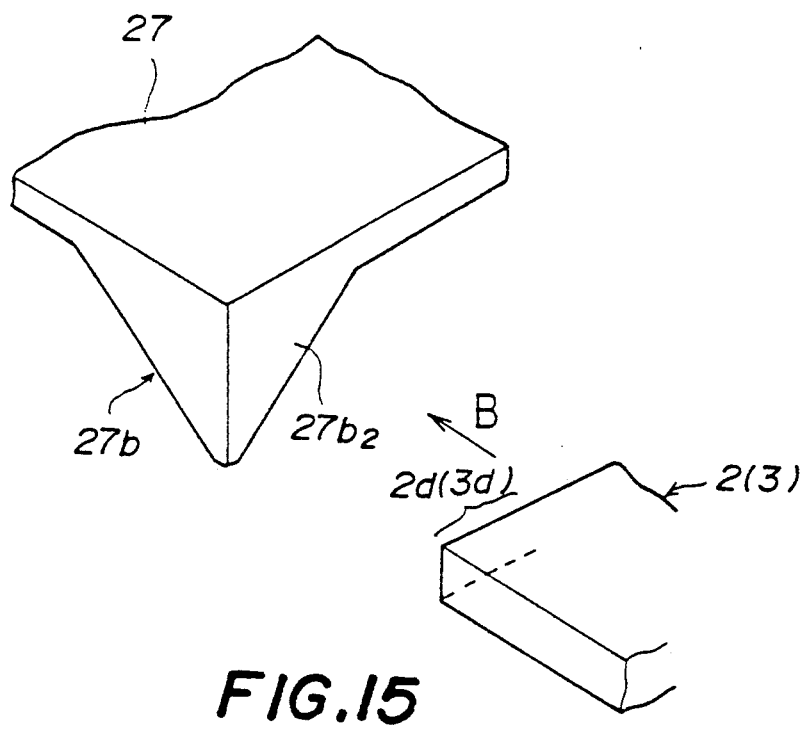
FIG. 14 shows a view for explaining a case where a magnetic disk disk cartridge or a CD-ROM cartridge is being inserted into the magneto-optical disk storage shown in FIG. 9 with the correct orientation.
Figure 15:
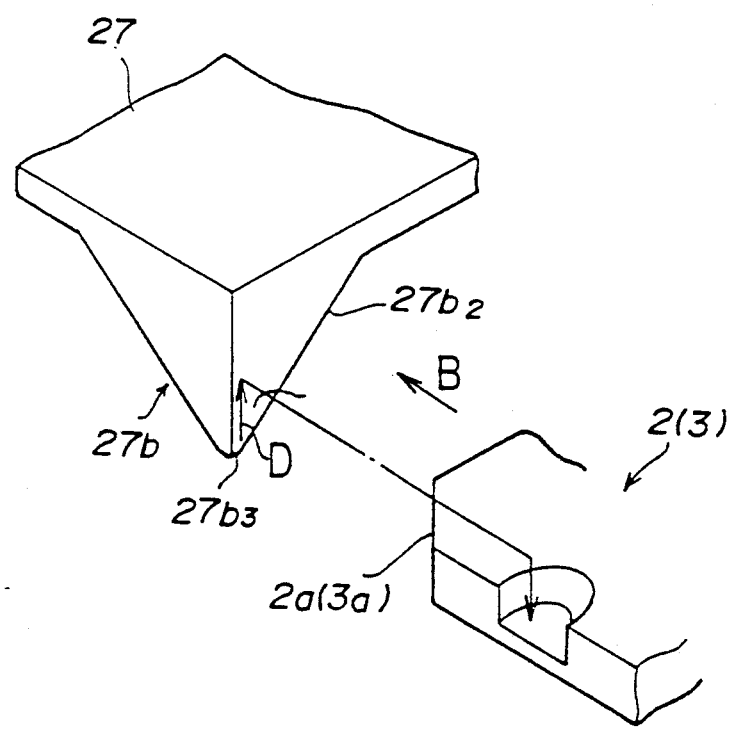
FIG. 15 shows a view for explaining a case where the magnetic disk cartridge or the CD-ROM cartridge is being inserted into the magneto-optical disk storage shown in FIG. 9 with an incorrect orientation.

If the magneto-optical disk cartridge 1 is being inserted with an incorrect orientation, as shown in FIG. 13, the front edge 1d touches the support surface $27d_2$ and thus the end part of the erroneous insertion preventing part 27b touches the notch 23d, so that the magneto-optical disk cartridge 1 cannot be inserted further.

Figure 7:
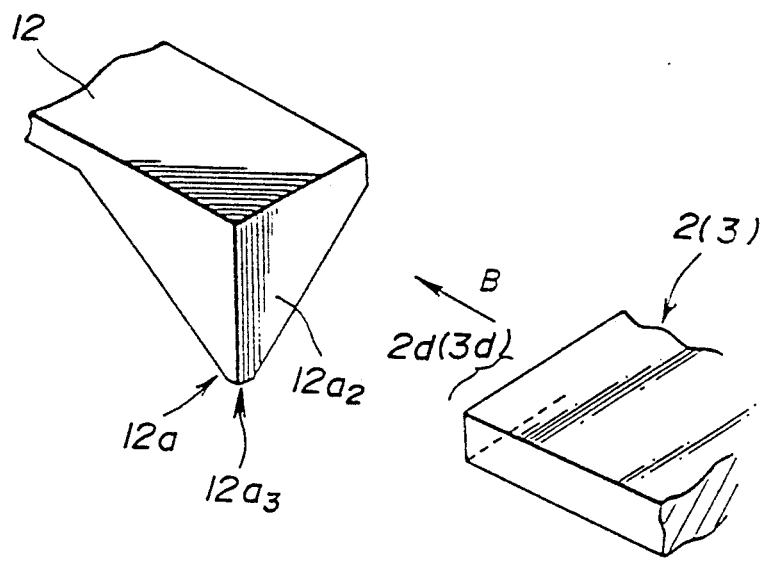
FIG. 7 shows a view for explaining a case where a magnetic disk cartridge or a CD-ROM cartridge is being inserted into the magneto-optical disk storage shown in FIG. 4 with the correct orientation.
Figure 8:
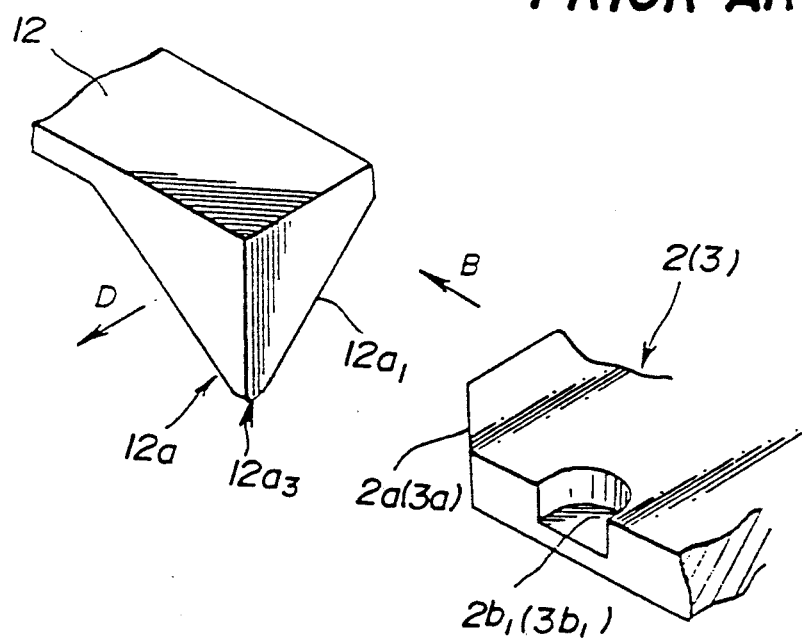
FIG. 8 shows a view for explaining a case where the magnetic disk cartridge or the CD-ROM cartridge is being inserted into the magneto-optical disk storage shown in FIG. 4 with an incorrect orientation.

On the other hand, if the magnetic disk cartridge 2 or the CD-ROM cartridge 3 is being inserted with the correct orientation, as described in FIG. 7, the front edge 2d (or 3d) touches the support surface $27b_2$ and the cartridge 2 or 3 cannot be inserted further. In addition, if the magnetic disk cartridge 2 or the CD-ROM cartridge 3 is being inserted with the incorrect orientation, as shown in FIG. 8, the surface 2a (or 3a) can withdraw the hypotenuse $12a_1$ in the direction $D_1$, however, the cartridge 2 or 3 cannot be completely inserted therein since a peak part $27b_3$ of the erroneous insertion preventing part 27b is inserted into the detent for auto loading $2b_1$ (or $3b_1$) to fix it. Thus, the erroneous insertion preventing mechanism 11 only allows the magneto-optical disk cartridge 1 with the correct orientation to be completely inserted.

Figure 16:
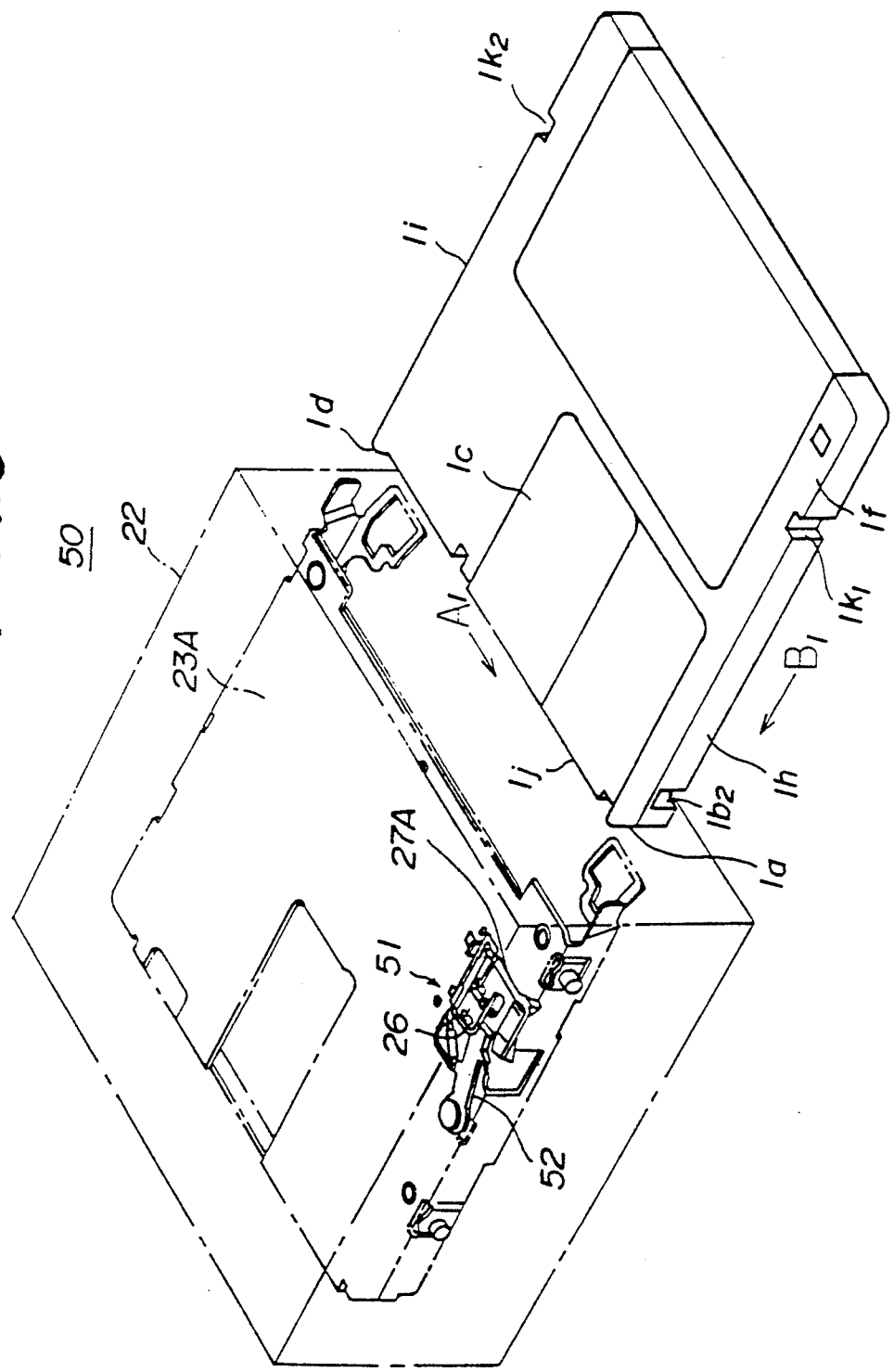
FIG. 16 shows a perspective view of a magneto-optical disk storage of a second embodiment according to the present invention.

A description will now be given of the magneto-optical disk storage 50 of the second embodiment according to the present invention with reference to FIGS. 16 to 29. Those elements which are the same as corresponding elements in FIGS. 9 to 15 are designated by the same reference numerals, and a description thereof will be omitted. In FIG. 16, the front vessel is omitted. The holder 23A corresponds to the holder 23 shown in FIG. 9, and the erroneous insertion preventing member 27A corresponds to the erroneous insertion preventing member 27 shown in FIG. 9. In this embodiment, the magneto-optical disk storage 50 is thinner in the direction E than the magneto-optical disk storage 20. If the erroneous insertion preventing part 27b of the magneto-optical disk storage 20 is miniaturized, the magneto-optical disk storage 20 can accordingly be made thinner in the direction E. However, if the erroneous insertion preventing part 27b is miniaturized, there occurs a case where the magnetic disk cartridge 2 or CD-ROM cartridge 3 with the incorrect orientation can be further inserted since the surface 2a of the magnetic disk cartridge 2 or the surface 3a of the CD-ROM cartridge 3 does not touch the hypotenuse $27b_1$ of the erroneous insertion preventing part 27b. Accordingly, it is an object of this embodiment to provide an erroneous insertion preventing mechanism 51 which allows the magneto-optical disk storage to be made thinner while also preventing the magnetic disk cartridge 2 and/or the CD-ROM cartridge 3 from being further inserted.

Figure 17:
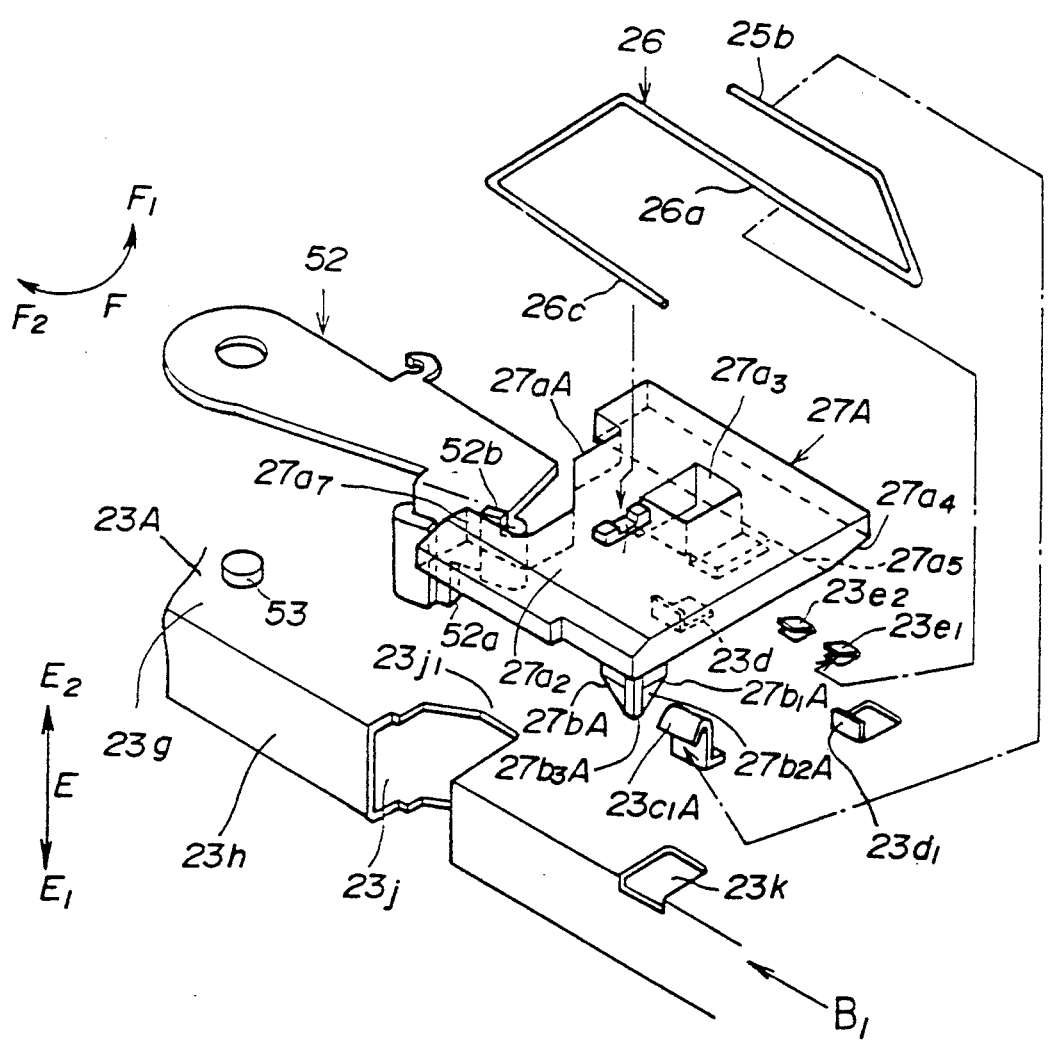
FIG. 17 shows a perspective view of an erroneous insertion preventing mechanism of the magneto-optical disk storage shown in FIG. 16.
Figure 18:
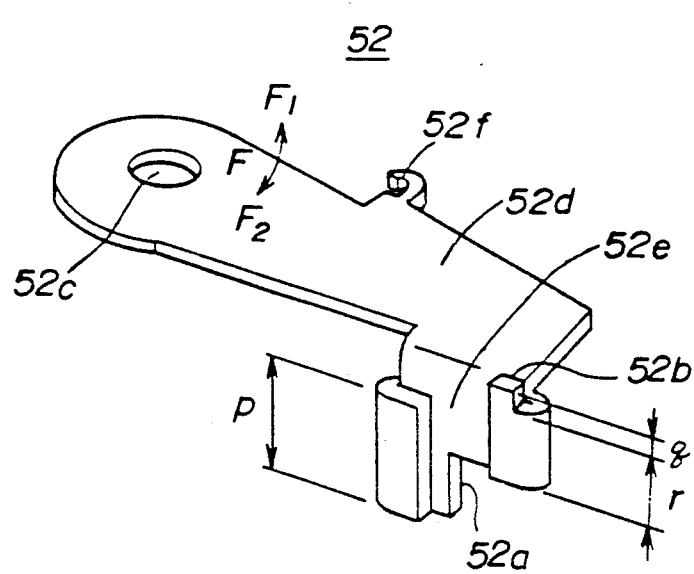
FIG. 18 shows a perspective view of an erroneous insertion preventing arm of the erroneous insertion preventing mechanism shown in FIG. 17.
Figure 19:
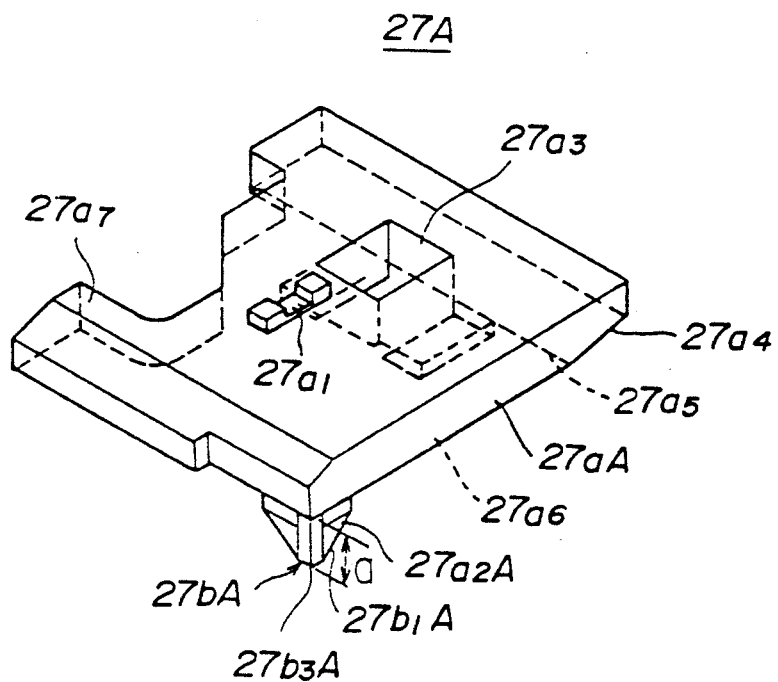
FIG. 19 shows a perspective view of an erroneous insertion preventing member of the erroneous insertion preventing mechanism shown in FIG. 17.

The erroneous insertion preventing mechanism 51 comprises, as shown in FIGS. 17 to 19, an erroneous insertion preventing arm 52, the spring member 26, an erroneous insertion preventing member 27A, a pin 53 and a tension spring 54. The erroneous insertion preventing member 27A is basically the same as the erroneous insertion preventing member 27, as shown in FIG. 10, except that the erroneous insertion preventing part 27bA has a height "a" which is about half the height of the erroneous insertion preventing part 27b. Due to "a"<"b", the holder 23A can be made thinner in the direction E.

The erroneous insertion preventing arm 52 comprises, as shown in FIG. 18, bent metal plates 52d and 52e, which are made by means of press processing. The plate 52e is formed by bending an end of an L-shaped part of the plate 52d. The plate 52e has a width suitable for engaging with the disk cartridge. The plate 52d has a hole 53c and an engaging part 52f. The plate 52e has a first erroneous insertion preventing part 52a and a projecting part 52b.

The first erroneous insertion preventing part 52a and the projecting part 52b are respectively formed by bending the plate 52e. Thus, the first erroneous insertion preventing part 52a and the projecting part 52b have a curved surface, so that damage to the inserted cartridge can be prevented even when the cartridge touches the above parts. The plate 52e has an approximately reverse L-shape, and the first erroneous insertion preventing part 52a and the projecting part 52b are respectively located at an end thereof. The first erroneous insertion preventing part 52a has a length "p", and a relationship $T-p<t_2$ can be established. Hereupon, "T" is a thickness of the holder 23A. In addition, the thickness of the erroneous insertion preventing part 52a is such that the magneto-optical disk storage 50 can be made thin in the direction D.

The projecting part 52b projects above the upper surface 23g of the holder 23A in the direction $E_1$. The erroneous insertion preventing arm 52 touches the holder 23A and the erroneous insertion preventing member 27A via the projecting part 52b. The projecting part 52b has a length "q" so that the projecting part 52b can be spaced apart from the erroneous insertion preventing member 27A when the erroneous insertion preventing member 27A moves in the direction $E_1$. In addition, the projecting part 52b has a length "r" which is approximately equal to the height "a" of the erroneous insertion preventing part 27bA.

The hole 53c is formed at an end of the plate 52d opposite to the end having the plate 52e.

The engaging part 52f may be formed at the center of the plate 52e.

The pin 53 is provided on the upper surface 23g of the holder 23A in the vicinity of the side surface 23h. The pin 53 is inserted into the hole 53c of the erroneous insertion preventing arm 52. Thus, the erroneous insertion preventing arm 52 is pivotally supported on the holder 23A around the hole 53c in the direction F. The pin 53 is provided so that the first erroneous insertion preventing part 52a can correspond to a notch 23j of the holder 23A which has a predetermined shape $23j_1$.

Figure 20A:
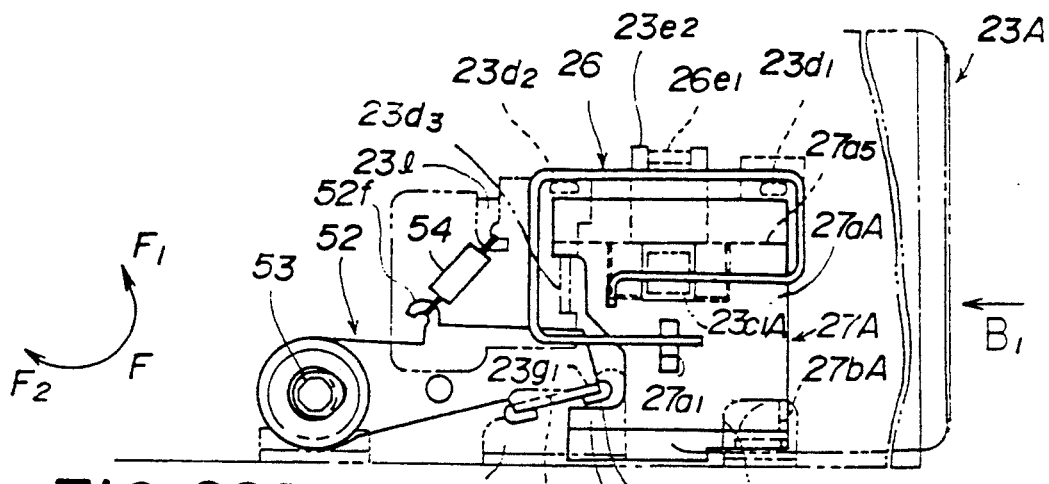
FIG. 20 shows a plan view of the erroneous insertion preventing mechanism in a case where the erroneous insertion preventing member shown in FIG. 19 is engaged with the erroneous insertion preventing arm shown in FIG. 18.
FIG. 20B shows a cross-sectional view of the erroneous insertion preventing mechanism in a case where the erroneous insertion preventing member shown in FIG. 19 is engaged with the erroneous insertion preventing arm shown in FIG. 18.
FIG. 20C shows a longitudinal sectional view of the erroneous insertion preventing mechanism in a case where the erroneous insertion preventing member shown in FIG. 19 is engaged with the erroneous insertion preventing arm shown in FIG. 18.

As shown in FIG. 20A, one end of the tension spring 54 is engaged with the engaging part 52f of the erroneous insertion preventing arm 52 and the other end thereof is engaged with an engaging part 231 mounted on the holder 23A. Thus, even if the erroneous insertion preventing arm 52 is forced in the direction $F_1$ by the tension spring 54, since the projecting part 52b projects and engages with the notch 23j, so that the erroneous insertion preventing arm 52 can be fixed. While the projecting part 52b is being projected and engaged with the notch 23j, the first erroneous insertion preventing part 52a projects into the holder 23A. Incidentally, the engaging part 231 is formed by bending the upper surface 23g of the holder 23A.

The erroneous insertion preventing member 27A comprises, as shown in FIG. 19, a body 27aA and a second erroneous insertion preventing part 27bA. The body 27aA has a lock part $27a_7$. The erroneous insertion preventing member 27A is engaged with the erroneous insertion preventing arm 52 via the lock part 27a₇. While the lock part 27a₇ and the erroneous insertion preventing arm 52 are engaged with each other, the erroneous insertion preventing arm 52 cannot pivot in the direction F₁ and thus the first erroneous insertion preventing part 52a projects into the holder 23A.

Figure 20B:
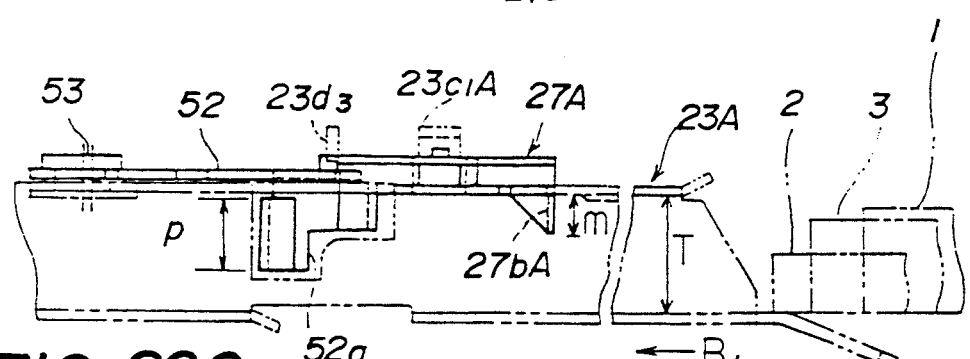
Figure 20C:
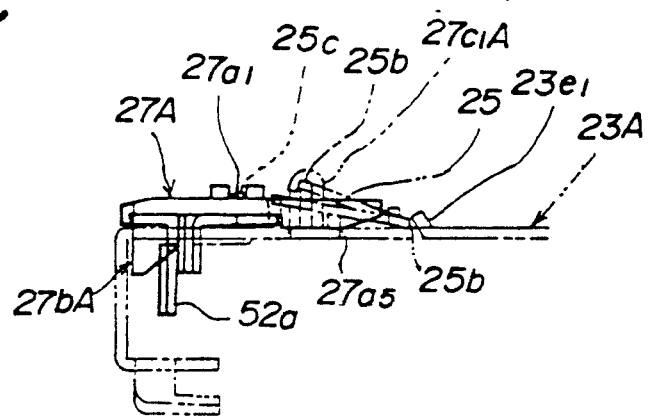

The second erroneous insertion preventing part 27bA projects into the holder 23A by "m", which is one-third of "T", as shown in FIG. 20B. Due to T−m>t₂, the surface 1a of the magneto-optical disk cartridge 1 or the surface 3a of the CD-ROM cartridge 3 can touch the second erroneous insertion preventing part 27bA and the projecting part 52b, while the surface part 2a of the magnetic disk cartridge 2 cannot touch them. The second erroneous insertion preventing member 27bA is inserted into the hole 23k on the holder 23A.

A description will now be given of the operation of the erroneous insertion preventing mechanism 51. Before the cartridge is inserted, the projecting part 52b is projected and engaged with the notch 23j in the direction F₁, and engaged with the lock part 27a in the direction F₂. Therefore, the first erroneous insertion preventing part 52a projects into the holder 23A.

Figure 21:
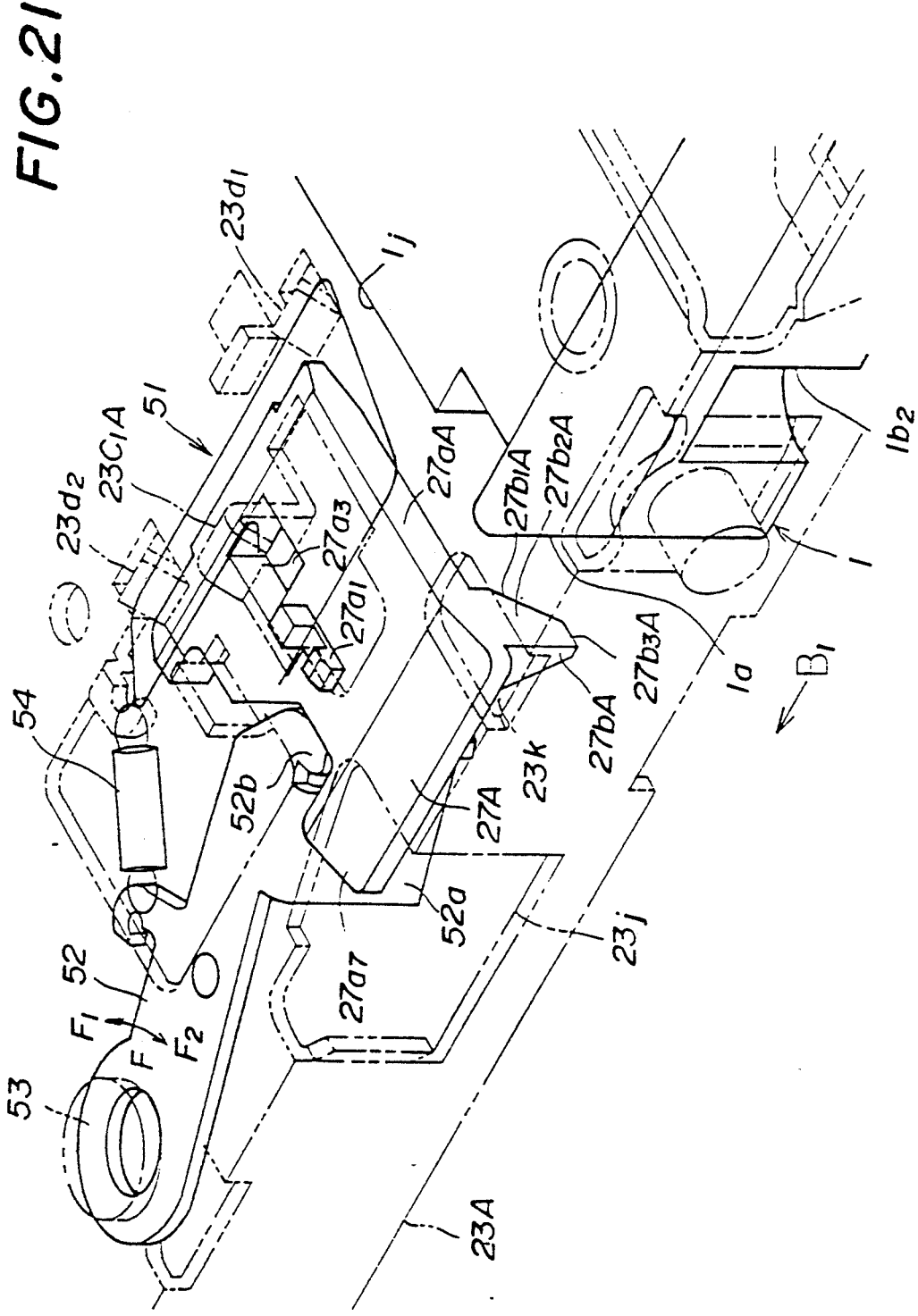
FIG. 21 shows a perspective view for explaining a case where a magneto-optical disk cartridge is being inserted into the magneto-optical disk storage shown in FIG. 16 with the correct orientation.
Figure 22A:
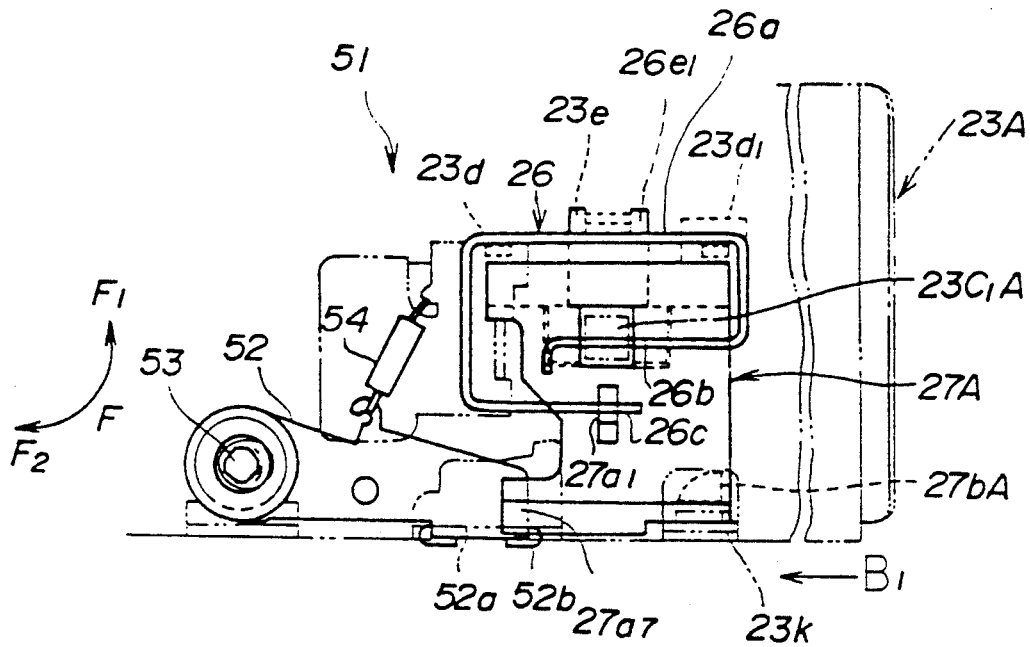
FIG. 22A shows a plan view of the erroneous insertion preventing mechanism in a case where the erroneous insertion preventing member shown in FIG. 19 is spaced apart from the erroneous insertion preventing arm shown in FIG. 18.
Figure 22B:
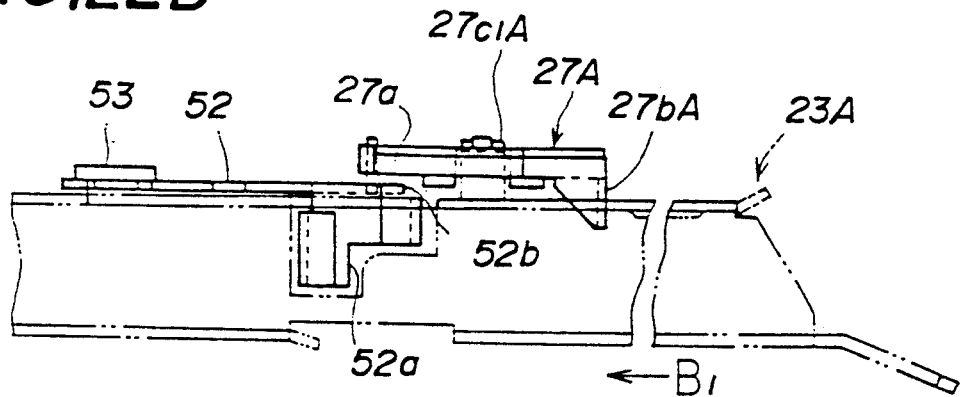
FIG. 22B shows a cross-sectional view of the erroneous insertion preventing mechanism in a case where the erroneous insertion preventing member shown in FIG. 19 is spaced apart from the erroneous insertion preventing arm shown in FIG. 18.
Figure 22C:
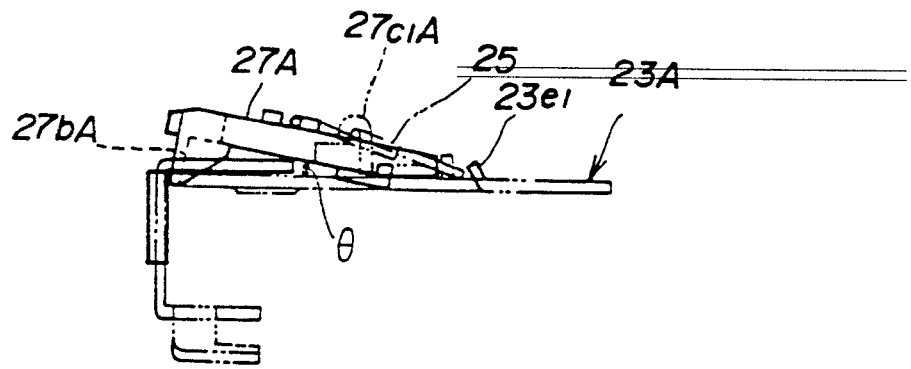
FIG. 22C shows a longitudinal sectional view of the erroneous insertion preventing mechanism in a case where the erroneous insertion preventing member shown in FIG. 19 is spaced apart from the erroneous insertion preventing arm shown in FIG. 18.

If the magneto-optical disk cartridge 1 is being inserted with the correct orientation, as shown in FIGS. 16 and 21, the surface 1a touches the hypotenuse 27b₃A, as shown in FIG. 23 and then withdraws the second erroneous insertion preventing part 27bA in the direction E₁, as shown in FIG. 22C, so that the cartridge 1 can be still further inserted into the holder 23A. Due to a<b, a rotating angle is relatively small. Thus, the lock part 27a₇ is spaced from the projecting part 52b, and the projecting part 52b can move in the direction F₂. When the cartridge 1 is further inserted, the surface 1a touches the first erroneous insertion preventing part 52a so as to withdraw it in the direction D, and thus the cartridge 1 can be completely inserted into the holder 23A. As shown in FIG. 22A, the first erroneous insertion preventing part 52a does not project beyond the side surface 23h.

Figure 25:
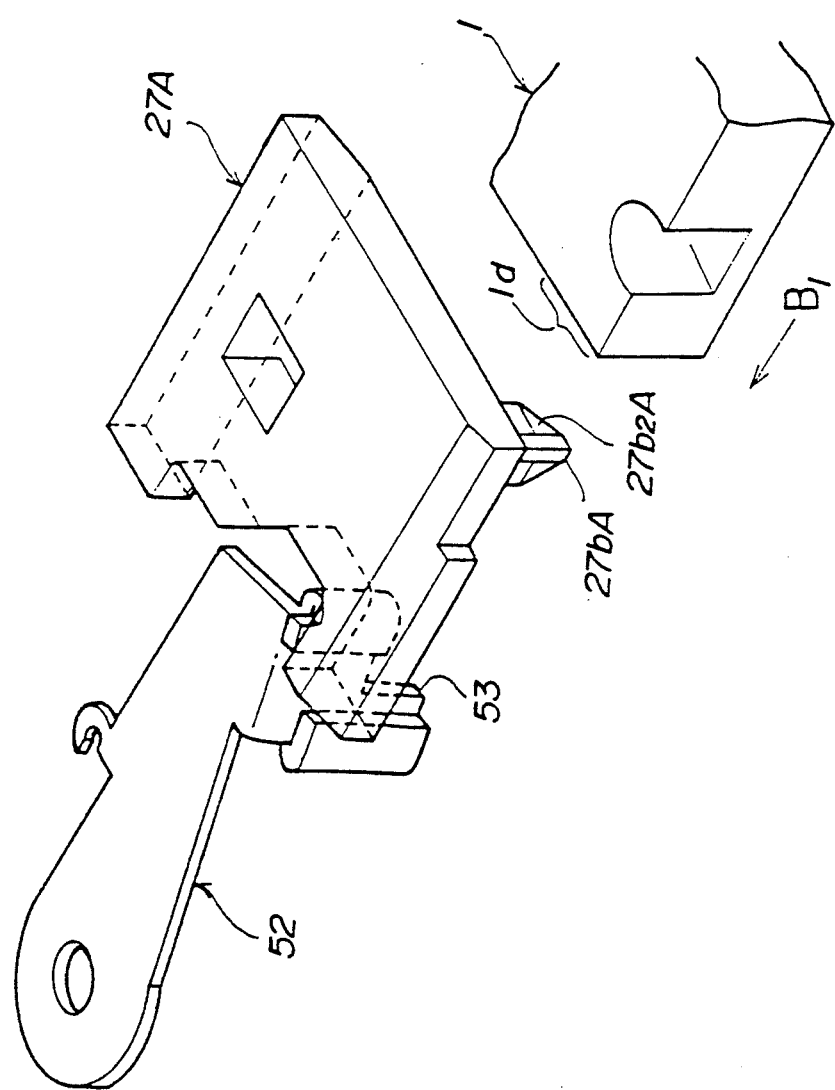
FIG. 25 shows a perspective view for explaining a case where the magneto-optical disk cartridge is being inserted with the incorrect orientation into the magneto-optical disk storage shown in FIG. 16.

If the magneto-optical disk cartridge 1 is being inserted with the incorrect orientation, as shown in FIG. 25, the front edge 1d touches the support surface 27b₂A of the second erroneous insertion preventing part 27bA, so that the cartridge 1 cannot be inserted any longer.

Figure 26:
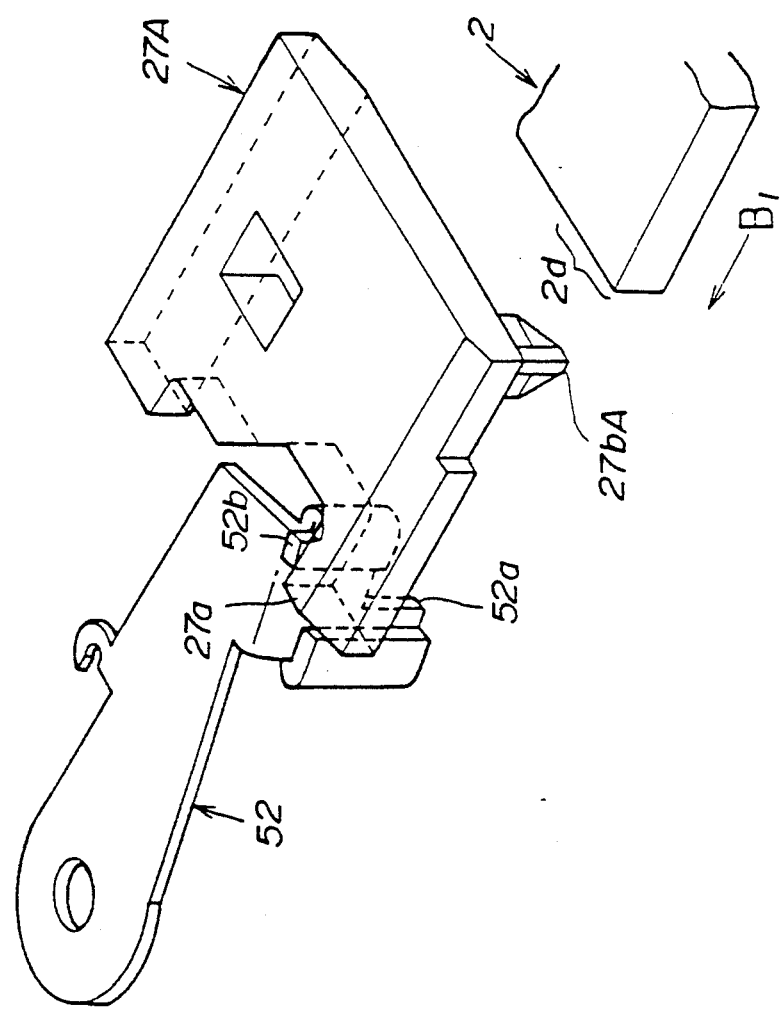
FIG. 26 shows a principle perspective view for explaining a case where the magnetic disk cartridge is being inserted with the correct orientation into the magneto-optical disk storage shown in FIG. 16.

If the magnetic disk cartridge 2 is being inserted with the correct orientation, as shown in FIG. 26, the front edge 2d of the cartridge 2 does not touch the second erroneous insertion preventing part 27bA and the projecting part 52b, but instead passes beneath them and touches the first erroneous insertion preventing part 52a. Since the lock part 27a and the projecting part 52b are engaged with each other, the projecting part 52b cannot move in the direction F₂, so that the cartridge 2 cannot be any further inserted because of the first erroneous insertion preventing part 52a.

Figure 27:
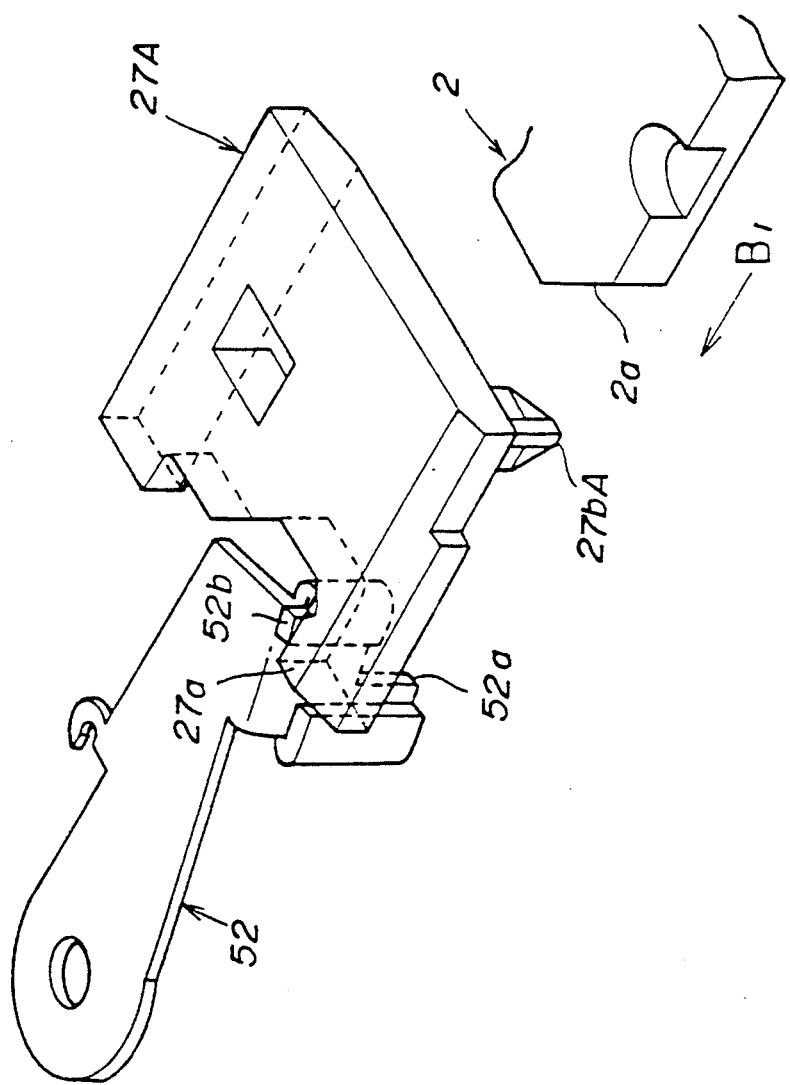
FIG. 27 shows a perspective view for explaining a case where the magnetic disk cartridge is being inserted with the incorrect orientation into the magneto-optical disk storage shown in FIG. 16.

If the magnetic disk cartridge 2 is being inserted with the incorrect orientation, as shown in FIG. 27, the front edge 2d does not touch the second erroneous insertion preventing part 27bA and the projecting part 52b, but passes beneath them and touches the first erroneous insertion preventing part 52a. Since the lock part 27a₇ and the projecting part 52b are engaged with each other, the projecting part 52b cannot move in the direction F₂, so that the cartridge 2 cannot be any further inserted because of the first erroneous insertion preventing part 52a.

Figure 28:
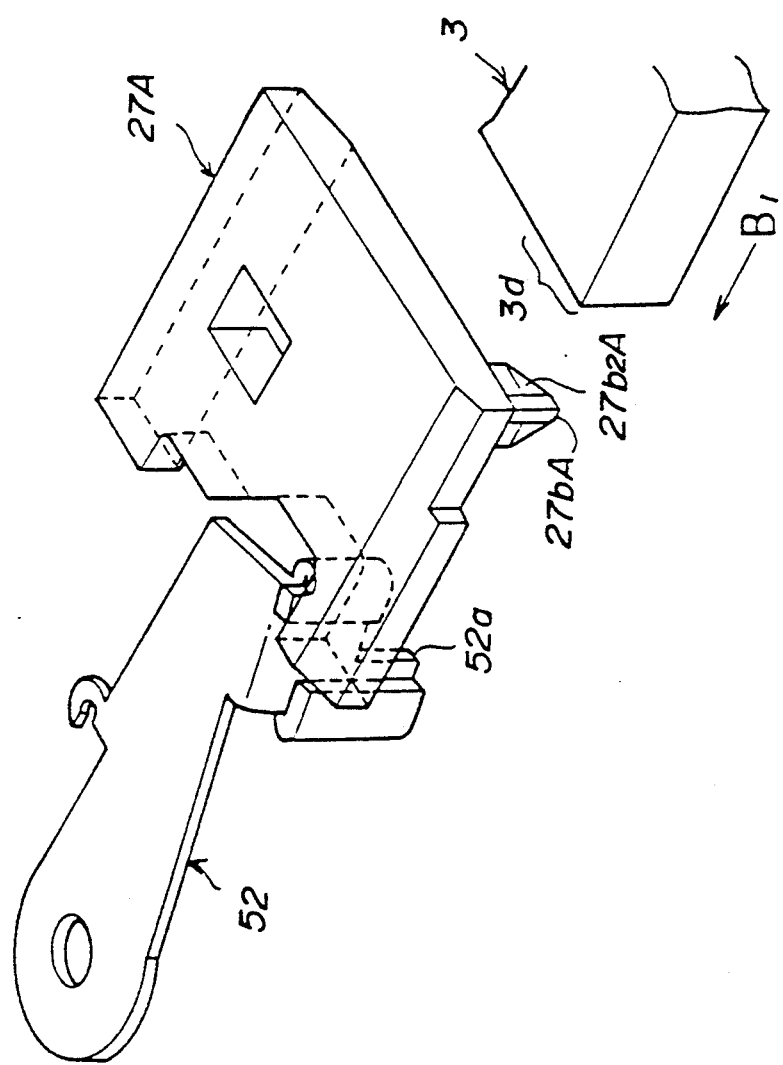
FIG. 28 shows a perspective view for explaining a case where the CD-ROM cartridge is being inserted with the correct orientation into the magneto-optical disk storage shown in FIG. 16.

If the CD-ROM cartridge 3 is being inserted with the correct orientation, as shown in FIG. 28, the front edge 3d touches the support surface 27b₂A of the second erroneous insertion preventing part 27bA, so that the cartridge 3 cannot be inserted further.

Figure 29:
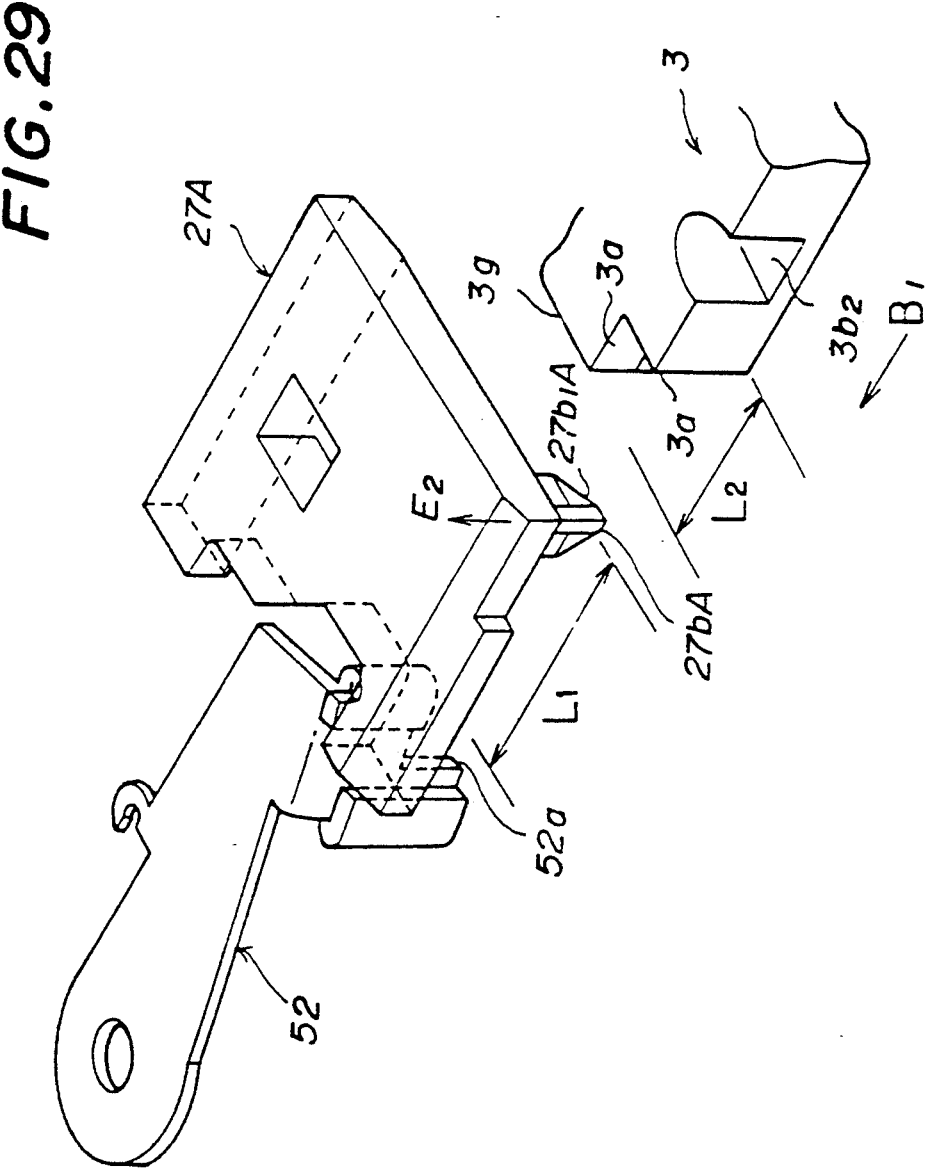
FIG. 29 shows a perspective view for explaining a case where the CD-ROM cartridge is being inserted with the incorrect orientation into the magneto-optical disk storage shown in FIG. 16.

If the CD-ROM cartridge 3 is being inserted with the incorrect orientation, as shown in FIG. 29, the surface 3a touches the hypotenuse 27b₁A of the second erroneous insertion preventing part 27bA so as to withdraw it in the direction E₁, so that the cartridge 3 can be further inserted. But then the peak part 27b₃ of the second erroneous insertion preventing part 27bA is engaged with the detent for auto loading 3b₂, so that the cartridge 3 cannot be inserted still further. The distance "l₁" between the second erroneous insertion preventing part 27bA and the first erroneous insertion preventing part 52a is longer than the length "L₂" between the front edge 3d and the detents for auto loading 3b₁ and 3b₂, so that the cartridge 3 cannot be completely inserted before the front edge 3d touches the first erroneous insertion preventing part 52a.

Incidentally, the second erroneous insertion preventing part 27bA may be miniaturized so that the second erroneous insertion preventing part 27bA can be inserted into a concave portion in the surface 3a in order to prevent the cartridge 3 from being further inserted.

Further, the present invention is not limited to these embodiments, and various variations and modifications may be made without departing from the scope of the present invention.

What is claimed is:

1. A magneto-optical disk storage for a magneto-optical disk cartridge having a magneto-optical disk therein, said magnetic-optical disk cartridge having a mis-insert protect, said magneto-optical disk storage comprising:
   a holder to and from which a magneto-optical disk cartridge having a magneto-optical disk therein is inserted and ejected;
   recording/reproducing means for recording information on a recording surface of the magneto-optical disk and for reproducing information therefrom; and
   an erroneous insertion preventing mechanism which projects into said holder so that said erroneous insertion preventing mechanism can touch the magneto-optical disk cartridge, in order to prevent same from being inserted, and which mechanically engages with the magneto-optical disk cartridge, said erroneous insertion preventing mechanism allowing the magneto-optical disk cartridge to be inserted only if the magneto-optical disk cartridge is being inserted into said holder with a correct orientation;
   said erroneous insertion preventing mechanism comprising:
   an erroneous insertion preventing member having an erroneous insertion preventing part having a reverse trigonal pyramid shape with a first portion mechanically engageable with the mis-insert protect of the magneto-optical disk cartridge; and
   a spring member which forces the erroneous insertion preventing member into said holder in a direction approximately perpendicular to the recording surface of the magneto-optical disk inserted in the holder, whereby, if the magneto-optical disk cartridge is being inserted with the correct orientation into said holder, the mis-insert protect of the magneto-optical disk cartridge is mechanically engaged with the first portion of the erroneous insertion preventing part so that said erroneous insertion preventing member moves away from the cartridge in a direction approximately perpendicular to the recording surface of the magneto-optical disk against the force of said spring member 2. A magneto-optical disk storage according to claim 1, wherein said erroneous insertion preventing part has a size such that, if a CD-ROM cartridge is being inserted into said holder, the erroneous insertion preventing part can touch the CD-ROM cartridge.

3. A magneto-optical disk storage according to claim 1, wherein said erroneous insertion preventing part has a size such that, if a magnetic disk cartridge is being inserted into said holder, the erroneous insertion preventing part can touch the magnetic disk cartridge.

4. A magneto-optical disk storage according to claim 1, wherein the erroneous insertion preventing member is located within a predetermined distance from a first position at which a first surface of the magneto-optical disk cartridge is located when the magneto-optical disk is completely inserted into said holder, the first surface being normal to an insertion direction of the magneto-optical disk cartridge and adjacent to the mis-insert protect of the magneto-optical disk cartridge, and the predetermined distance being a distance between the first surface and a gripper slot of the magneto-optical disk cartridge.

5. A magneto-optical disk storage according to claim 2, wherein the erroneous insertion preventing part has a shape such that, if a CD-ROM cartridge is being inserted with an incorrect orientation into said holder, the erroneous insertion preventing part can be inserted into a detent for autoloading of the CD-ROM cartridge in order to prevent the CD-ROM cartridge from being further inserted.

6. A magneto-optical disk cartridge according to claim 3,
wherein the erroneous insertion preventing part has a shape such that, if a magnetic disk cartridge is being inserted with an incorrect orientation into said holder, the erroneous insertion preventing part can be inserted into a detent for autoloading of the magnetic disk cartridge in order to prevent the magnetic disk cartridge from being further inserted.

7. A magneto-optical disk storage comprising:
a holder to and from which a magneto-optical disk cartridge having a magneto-optical disk therein is inserted and ejected;
recording/reproducing means for recording information on a recording surface of the magneto-optical disk and for reproducing information therefrom; and
a first erroneous insertion preventing mechanism which projects into said holder so that the first erroneous insertion preventing mechanism can touch the magneto-optical disk cartridge in order to prevent the same from being inserted, and which mechanically engages with the magneto-optical disk cartridge, said first erroneous insertion preventing mechanism moving in a first direction approximately perpendicular to the recording surface of the magneto-optical disk, and allowing the magneto-optical disk cartridge to be inserted only if the magneto-optical disk cartridge is being inserted into said holder with a correct orientation; and
a second erroneous insertion preventing mechanism which projects into said holder so that the second erroneous insertion preventing mechanism can touch the magneto-optical disk cartridge in order to prevent the same from being inserted, said second erroneous insertion preventing mechanism mechanically engaging, when the first erroneous insertion preventing mechanism moves in the first direction, with the magneto-optical disk cartridge for moving in a second direction which is normal to an insertion direction of the magneto-optical disk and orthogonal to the first direction.

8. A magneto-optical disk storage according to claim 7, wherein said first erroneous insertion preventing mechanism has a size such that said first erroneous insertion preventing mechanism cannot touch a magnetic disk cartridge if the magnetic disk cartridge is being inserted into said holder.

9. A magneto-optical disk storage according to claim 7, wherein said second erroneous insertion preventing mechanism has an approximately curved surface via which said second erroneous insertion preventing mechanism touches the magneto-optical disk.

10. A magneto-optical disk storage according to claim 7, wherein said magneto-optical disk cartridge has a mis-insert protect
wherein said first erroneous insertion preventing mechanism comprises:
an erroneous insertion preventing member having an erroneous insertion preventing part having a reverse trigonal pyramid shape with a first portion mechanically engageable with the mis-insert protect of the magneto-optical cartridge; and
a spring member which forces the erroneous insertion preventing member into said holder in a direction approximately perpendicular to the recording surface of a magneto-optical disk inserted in the holder, whereby if the magneto-optical disk cartridge is being inserted with the correct orientation into said holder, the mis-insert protect of the magneto-optical disk cartridge is mechanically engaged with the first portion of the erroneous insertion preventing part so that said erroneous insertion preventing part moves away from the cartridge in the direction approximately perpendicular to the recording surface of the magneto-optical disk against the force of said spring member.

11. A magneto-optical disk storage according to claim 10, wherein the first erroneous insertion preventing member is located within a predetermined distance from a first position at which a first surface of the magneto-optical disk cartridge is located when the magneto-optical disk is completely inserted into said holder, the first surface being normal to an insertion direction of the magneto-optical disk cartridge and adjacent to the mis-insert protect of the magneto-optical disk cartridge, and the predetermined distance being a distance between the first surface and a gripper slot of the magneto-optical disk cartridge.

12. A magneto-optical disk storage according to claim 10, wherein the erroneous insertion preventing part has a size such that the erroneous insertion preventing part can be inserted into a mis-insert protect of a CD-ROM cartridge.

* * * * *

UNITED STATES PATENT AND TRADEMARK OFFICE
CERTIFICATE OF CORRECTION

PATENT NO. : 5,164,935
DATED : November 17, 1992
INVENTOR(S) : Shimegi et al

It is certified that error appears in the above-identified patent and that said Letters Patent is hereby corrected as shown below:

CLAIM 6, Col. 13, Line 38, delete "cartridge and substitute therefor ---storage---.

Signed and Sealed this

Ninth Day of November, 1993

BRUCE LEHMAN

*Attest:*

*Attesting Officer*

*Commissioner of Patents and Trademarks*